(12) United States Patent
Gao

(10) Patent No.: US 11,374,736 B2
(45) Date of Patent: Jun. 28, 2022

(54) SYSTEM AND METHOD FOR HOMOMORPHIC ENCRYPTION

(71) Applicant: Clemson University, Clemson, SC (US)

(72) Inventor: Shuhong Gao, Clemson, SC (US)

(73) Assignee: Clemson University, Clemson, SC (US)

(*) Notice: Subject to any disclaimer, the term of this patent is extended or adjusted under 35 U.S.C. 154(b) by 233 days.

(21) Appl. No.: 16/447,831

(22) Filed: Jun. 20, 2019

(65) Prior Publication Data

US 2019/0394019 A1 Dec. 26, 2019

Related U.S. Application Data

(60) Provisional application No. 62/687,681, filed on Jun. 20, 2018.

(51) Int. Cl.
*H04L 29/06* (2006.01)
*H04L 9/00* (2022.01)
*H04L 9/30* (2006.01)

(52) U.S. Cl.
CPC ............... *H04L 9/008* (2013.01); *H04L 9/30* (2013.01)

(58) Field of Classification Search
CPC .................................. H04L 9/008; H04L 9/30
See application file for complete search history.

(56) References Cited

U.S. PATENT DOCUMENTS

| | | | | |
|---|---|---|---|---|
| 9,306,738 B2* | 4/2016 | Loftus | ...................... | H04L 9/008 |
| 10,749,665 B2* | 8/2020 | Laine | .................... | H04L 9/3093 |
| 2013/0091353 A1* | 4/2013 | Zhang | .................. | H04L 9/3268 |
| | | | | 713/156 |
| 2015/0358153 A1* | 12/2015 | Gentry | .................. | H04L 9/3093 |
| | | | | 380/30 |
| 2019/0007197 A1* | 1/2019 | Laine | .................... | H04L 9/0618 |

* cited by examiner

*Primary Examiner* — Joseph P Hirl
*Assistant Examiner* — Leynna Truvan
(74) *Attorney, Agent, or Firm* — Kim and Lahey Law Firm LLC; Douglas W. Kim

(57) ABSTRACT

This is a system and method for homomorphic encryption comprising: a key generation module configured to generate a secret key, a public key and a bootstrapping key; a private-key encryption module configured to generate a first ciphertext using the secret key; a public-key encryption module configured to generate a second cyphertext using the public key; a private-key decoding module configured to decode a first ciphertext, a second ciphertext and an encrypted analytic result; a homomorphic computational module configured to perform an analytical operation, according to an analytical operation request on the first ciphertext and the second ciphertext without decrypting the first ciphertext and the second ciphertext using the bootstrapping key; and, wherein the encrypted analytical result is provided by the homomorphic computational module and are encrypted with the secret key.

23 Claims, 4 Drawing Sheets

SYSTEM AND METHOD FOR HOMOMORPHIC ENCRYPTION

STATEMENT REGARDING FEDERALLY SPONSORED RESEARCH OR DEVELOPMENT

This invention was made with government support under grants CCF-1407623, DMS-1403062 and DMS-1547399 awarded by National Science Foundation. The government has certain rights in the invention.

BACKGROUND OF THE INVENTION

(1) Field of the Invention

This invention relates generally to data encryption methods and, more specifically, to encryption and decryption algorithms, and homomorphic computing algorithms and apparatus.

(2) Description of Related Art

As cloud computing, internet of things (IoT) and blockchain technology become increasingly prevalent, there is an urgent need to protect the privacy of massive volumes of sensitive data collected or stored in computer networks or cloud servers, as many of the networks or servers can be vulnerable to external and internal threats such as malicious hackers or curious insiders. In the case of blockchain technology, it is the privacy issue that hinders widespread enterprise adoption of blockchains, despite the transparency and immutability that the technology offers. The traditional encryption schemes can provide privacy protection of data but do not allow for the performance of analytics on encrypted data without decryption first.

There is a great need in homomorphic encryption schemes which have the following properties: (a) encrypted data can be stored anywhere (e.g. untrusted clouds, blockchains, or personal computers at home or at a hacker's control); (b) any third party (including cloud servers, hackers, miners or insiders) can perform searching or analytics of an arbitrary function on the encrypted data to get search results in encrypted form, however, only the data owner (who has the private decoding key) can decode the encrypted search results; (c) an adversary can access all the encrypted data and use all the available computing powers in the world but still cannot compute any information of the original data in reasonable time (e.g. 20 years or longer).

In previous constructions of homomorphic encryption schemes, random noise (or error) is added to ciphertexts, however, the noise grows quickly when one performs homomorphic operations on the ciphertexts, and the size of the new ciphertexts may grow as well. Therefore, only a limited number of homomorphic operations can be applied before the noise gets too big to destroy the message encoded in the ciphertexts. Gentry's proposed solution (Fully homomorphic encryption using ideal lattices, Proceedings of the 41st Annual ACM Symposium on Theory of Computing, STOC 2009, Bethesda, Md., USA, May 31-Jun. 2, 2009, pp. 169-178) is to perform homomorphic decoding before the noise gets to too big, that is, perform bootstrapping to reduce the noise size, then perform further homomorphic operations and bootstrapping as needed. An encryption scheme that allows all functions be homomorphically computed on encrypted data is called a fully homomorphic encryption (FHE) scheme; if only a class of limited functions (but not all possible functions) is allowed, then it is called a somewhat homomorphic encryption (SHE) scheme. In comparison, traditional cryptosystems (e.g. RSA, AES, elliptic curve cryptosystems, etc.) have properties (a) and (c), but not (b) which is the most challenging part of designing an FHE scheme.

To design a practical homomorphic encryption scheme, one has to solve three problems. First, the cipher expansion problem. The size ratio of the ciphertexts vs the original data must be small so that communications and storage are not too expensive, and the size of new ciphertexts obtained under homomorphic operations should be independent of the complexity of search functions; Second, the time efficiency problem. The cost of homomorphic computing of an arbitrary function f should be proportional to the complexity of f itself, and the overhead factor should only depend on a security parameter $\lambda$. Third, the security problem. The security of the scheme must be based on hard mathematical problems, and for a scheme deigned for a given security parameter $\lambda$ (e.g. $\lambda$=120, 160, 200, or larger), the cost of breaking the scheme should be at least $2^\lambda$ (in bit operations). Furthermore, the scheme should be secure even if quantum computers can be built.

Historically, dramatic progress on the time efficiency problem has been made in the last few years. In fact, three generations of homomorphic encryption schemes were developed, each of them has its advantages and disadvantages. The first generation is based on ideal lattices and approximate gcd problem of integers. The second generation is based on LWE and RLWE problems, and several techniques are developed, including modulus reduction, key switch and re-linearization, for mitigating noise growth. The BGV scheme is implemented in HElib, and the FV scheme is implemented in SEAL. The third generation refers to the GSW scheme which is based on RLWE and approximate eigenvalues; also a novel technique called flattening is invented to better control noise growth. For these schemes, bootstrapping is still prohibitively slow, hence are often implemented as leveled schemes to compute functions that have preset depth of multiplications, and they can handle patches of many bits simultaneously. In all these schemes, however, the ciphertext expansion is still too large, ranging from a few hundreds to tens of thousands (depending on the preset depth). This means that storage for encrypted data would be too expensive in practice for these schemes.

Ducas and Micciancio ("FHEW: bootstrapping homomorphic encryption in less than a second", Advances in cryptology—EUROCRYPT 2015. Part I, Lecture Notes in Comput. Sci., vol. 9056, Springer, Heidelberg, 2015, pp. 617-640) use the GSW scheme and some homomorphic embedding to design a bootstrapping procedure that can compute one homomorphic bit operation in less than a second. This scheme has been improved by Chillotti et al. ("Faster fully homomorphic encryption: Bootstrapping in less than 0.1 seconds", Advances in Cryptology—ASIACRYPT 2016: 22nd International Conference on the Theory and Application of Cryptology and Information Security, Hanoi, Vietnam, Dec. 4-8, 2016, Proceedings, Part I 22, Springer, 2016, pp. 3-33; "Improving TFHE: faster packed homomorphic operations and efficient circuit bootstrapping", https://eprint.iacr.org/2017/430) down to 13 ms (for one homomorphic bit operation). However, the cipher expansion of these schemes is still at least 8,000, which makes storage of encrypted data too expensive.

Accordingly, it is an object of the present invention to provide for a FHE scheme where the cipher expansion is 6 or less under private-key encryption and $7+\log_2(n)$ or less under public-key encryption where n (a power of 2) denotes the message block length, all ciphertexts are computed modulo r where r=O(n), and the noise size is bounded by $D_r$, which is some fixed number depending only on r.

It is another object of the present invention to have a bootstrapping processor (BP) that needs only a bootstrapping key and does the following: for any two LWE ciphers $E_s(x_1)$ and $E_s(x_2) \in \mathbb{Z}_r^n \times \mathbb{Z}_r$ with noise size bounded by $D_r$, it produces three random LWE ciphers:

$$E_s(x_1 \wedge x_2), E_s(x_1 \vee x_2), E_s(x_1 \oplus x_2) \in \mathbb{Z}_r^n \times \mathbb{Z}_r$$

with noise size still bounded by the same $D_r$ (with no failure at all), and the total time for the bootstrapping processor (BP) is estimated to be faster than that of Chillottie et al. (for the same blocklength n).

The above described BP allows immediately a homomorphic algorithm to perform analytics on encrypted data that is encrypted under the encryption schemes by private keys or by public keys of this invention and output encrypted analytc results. There is no restriction on the type of analytics that can be computed on encrypted data and number operations allowed is unlimited, and the computed encrypted analytic results are always valid.

It is another object of the present invention where security of the scheme is based on the LWE and RLWE problems (with binary secret keys). The scheme is secure under chosen plaintext attack (CPA) using the current computing technology available, and would still be secure even if quantum computers can be built in the future.

In previous bootstrapping algorithms, a new LWE cipher produced by bootstrapping may be invalid, with probability about $2^{-33}$ (for n=500). That is a very small probability, so useful for computing many functions, however, it can not be applied to functions that require more than $2^{33}$ bit operations (unless increasing n). In our scheme, the LWE ciphers after bootstrapping are always in $\mathbb{Z}_r^n \times \mathbb{Z}_r$ with error size bounded by $D_r$, hence always valid (e.g. no failure at all). This means that one can perform bootstrapping any number (unbounded) of times and all the new LWE ciphers are still in $\mathbb{Z}_r^n \times \mathbb{Z}_r$ with the same error size $D_r$. Due to this compactness, the computed ciphertexts do not leak any information on which function is computed, hence the scheme automatically provides function privacy. Another important feature of this invention is that the ciphertexts resulted from homomorphic computing are independent random. This is advantageous in designing protocols for secure multi-party computation and for zero knowledge proof.

SUMMARY OF THE INVENTION

The invention includes a Fully Homomorphic Encryption (FHE) scheme that includes: (a) a private-key encryption scheme with cipher expansion of 6 or less, (b) a public-key encryption scheme with cipher expansion of 20 or less; (c) a homomorphic computing algorithm where all computed ciphertexts after any number (unbounded) of homomorphic operations on encrypted data have the same size and are always valid; (d) its security is based on the Learning With Errors (LWE) and Ring Learning With Errors (RLWE) problems (with binary secret keys), and the scheme is secure even if quantum computers can be built. The advantages that could be realized include function privacy and could provide a simple solution for secure two-party computation and zero knowledge proof of any language in NP.

The invention can include a system and method for homomorphic encryption that includes computer readable instructions or a method of generating a secret key, a public key and a bootstrapping key; generating a first ciphertext using the secret key; generating a second cyphertext using the public key; providing an analytical operation request; performing an analytical operation, according to the analytical operation request on the first ciphertext and the second ciphertext without decrypting using the bootstrapping key; providing an encrypted analytical result wherein the encrypted analytical results are encrypted with the secret key; and, providing results decoded from the group consisting of the first ciphertext, the second ciphertext, and the encrypted analytical results of any combination thereof.

The system and method can include generating the first ciphertext using the secret key configured to have a cipher expansion of six or less, transmitting the encrypted analytical result from a server to a client, generating the second ciphertext configured to have a cipher expansion of 20 or less, receiving a first LWE cipher and a second LWE cipher encrypted using the secret key and receiving the bootstrapping key; and, generating a set of new LWE ciphers having a first new LWE cipher, a second new LWE cipher and a third new LWE cipher wherein the set of new LWE ciphers are in the same domain as the first LWE cipher and the second LWE cipher and have the same small modulus and error size as the first LWE cipher and the second LWE cipher.

The system and method can include lifting the first ciphertext with a small modulus to a lifted ciphertext with a large modulus and perform a limited number of operations on the lifted ciphertext, transforming a large modulus ciphertext to a small modulus ciphertext wherein the small modulus ciphertext is always valid, receiving a function on a data in the form of an arithmetic circuit having gates and an input wire and an output wire, accessing the bootstrapping key and first ciphertext, unpacking the first ciphertext into a LWE cipher to provide an input to the input wire to the arithmetic circuit, performing the analytical operation to each gate in the arithmetic circuit in the order from input wire to the output wire, providing results from the analytical operation wherein a results LWE ciphers at the output wires represent a results ciphertext of the value of the function; and, sending the results ciphertext to a client with the secret key wherein the results ciphertext is configured to be decoded by the client with the secret key where the decoded result is equal to the value of the function evaluated on an original data of the first ciphertext.

The system can include a server having a computer readable medium in communication with a first client and a second client; a set of computer readable instructions disposed on the server that, when executed by a processor, performs the steps of: receiving a public key and a bootstrapping key generated by the first client; receiving a first ciphertext encrypted using a secret key; receiving a second cyphertext encrypted using the public key; performing an analytical operation, according to an analytical operation request on the first ciphertext and the second ciphertext without decrypting using the bootstrapping key; providing an encrypted analytical result wherein the encrypted analytical results are encrypted with the secret key; and, providing results decoded from the group consisting of the first ciphertext, the second ciphertext, the encrypted analytical results of any combination thereof.

A system and method can be in the form of a compact fully homomorphic encryption scheme enables performing any analytics on encrypted data without decryption, applicable in various domains including, but not limited to, outsourced cloud services, blockchains networks, financial analysis, heath care services and social media where sensitive information is stored and processed. The system comprises of: an encryption scheme with private keys, an encryption scheme with public keys, and a homomorphic computing algorithm that can perform any number (unbounded) of operations on encrypted data and produces encrypted results. Each client can communicate with a server, or network of servers, and has a private key, a public key and a bootstrapping key, with the latter two being public. The client encrypts data using the private key and sends it to a cloud server. Any third party or multiple separate third parties can encrypt data from different locations using the client's public key and send the encrypted data to a cloud server or multiple cloud servers. Using the bootstrapping key, the cloud server (or servers) performs any analytics with no limit on number of operations requested by the client on the encrypted data, and returns the encrypted analytic result to the client. Only the client who has the secret decoding key can decode the encrypted analytic result, while any other party (including the cloud servers that store the encrypted data and perform analytics on the encrypted data) will not be able to compute any partial information on the original data nor the analytic result, even if quantum computers can be built.

DESCRIPTION OF THE DRAWINGS

The following description of the invention will be better understood by reference to the following drawings that are incorporated and made part of the written specification.

DETAILED DESCRIPTION OF THE INVENTION

Figure 1:
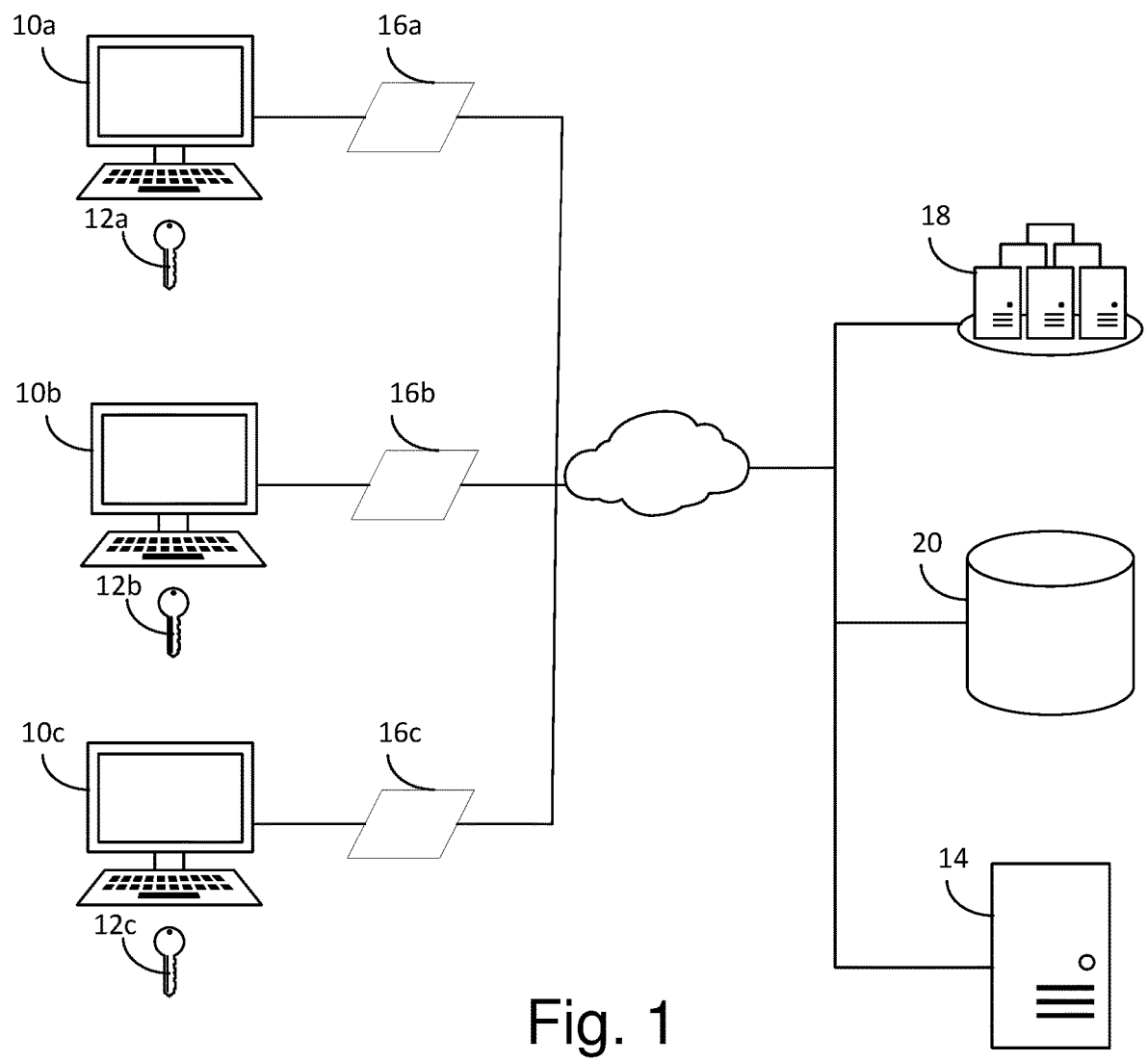
FIG. 1 is a diagram of aspects of the invention.

Referring to FIG. 1, a user terminal or client 10a through 10c can have an associated private or secret keys 12a through 12c which can be used to encrypt data. Further, the client can have publics keys that can also be used to encrypt data. Data 16a through 16c can be stored locally at each client or transmitted to a remote storage location such as servers 18 or a "cloud location" 20. Multiple data sources can be encrypted and stored on the servers or cloud locations and can be placed on the services or cloud location from multiple users. Computer readable instructions disposed on the client or server can include a key generation module configured to generate a secret key, a public key and a bootstrapping key. The computer readable instructions can include a private-key encryption module configured to generate a first ciphertext using the secret key. A public-key encryption module can be included in the computer readable instructions that are configured to generate a second cyphertext using the public key. The computer readable instructions can include a private-key decoding module configured to decode a first ciphertext, a second ciphertext and an encrypted analytic result. The computer readable instructions can include a homomorphic computational module configured to perform analytical operations, which can be unlimited, according to an analytical operation request on the first ciphertext and the second ciphertext without decrypting the first ciphertext and the second ciphertext using the bootstrapping key. The encrypted analytical result can be provided by the homomorphic computational module and are encrypted with the secret key. The second ciphertext can have a cipher expansion of 20 or less.

The private encryption module and the public encryption module can be disposed on a client 10a in electronic communications with a server 14. The homomorphic computational module can be disposed on the server; and, the encrypted analytical result can be transmitted from the server to the client 10a or other client.

The computer readable instructions can include a bootstrapping processor configured to receive a first LWE cipher and a second LWE cipher encrypted using the secret key, and the bootstrapping key and to generate a set of new LWE ciphers having a first new LWE cipher, a second new LWE cipher and a third new LWE cipher; and, where the set of new LWE ciphers are in the same domain as the first LWE cipher and the second LWE cipher and have the same small modulus and error size as the first LWE cipher and the second LWE cipher. The bootstrapping processor can include a homomorphic lifting procedure configured to lift the first ciphertext having a small modulus to a lifted ciphertext having a large modulus and perform a limited number of operations on the lifted ciphertext. The bootstrapping processor can include a modulus reduction configured to transform the lifted ciphertext to a small modulus ciphertext wherein the small modulus new ciphertext is always valid.

The homomorphic computational module can be configured for receiving a function on a data in the form of an arithmetic or Boolean circuit having gates, an input wire and an output wire, accessing the bootstrapping key and first ciphertext. unpacking the first ciphertext into a LWE cipher to provide an input to the input wire to the circuit, performing the analytical operation to each gate in the circuit in the order from input wire to the output wire, providing results from the analytical operation wherein a results LWE ciphers at the output wires represent a results ciphertext of the value of the function and sending the results ciphertext to a client with the secret key wherein the results ciphertext is configured to be decoded by the client with the secret key where a decoded result is equal to the value of the function evaluated on an original data of the first ciphertext. There can be no limit to the number of gates in the circuit representing the request function.

Figure 2:
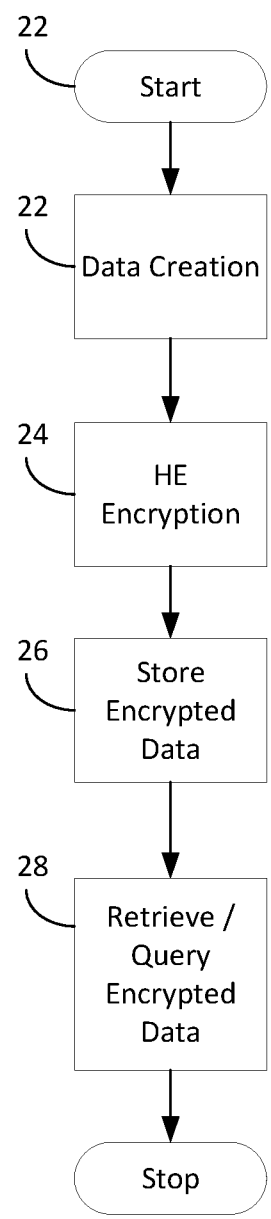
FIG. 2 is a flow chart of aspects of the invention.

Referring to FIG. 2, the operation of the present invention is shown as starting point 22. Data is created at 22. Computer readable instructions can use the encryption system of the present invention at 24 to encrypt the data. The data can then be stored remotely (e.g. cloud) at 26. Once stored, the data can be retrieved or queried at 28 without necessarily having to decrypt the data.

The present invention uses homomorphic encryption (HE) that allows data stored in the cloud to remain encrypted while computations are performed on the encrypted data without decryption. The present invention provides the ability for users of cloud storage platforms to retrieve or query encrypted information or data without having to first decrypt the data. As such, the invention reduces the risk of exposure and visibility of sensitive or confidential data to external parties, or individuals/entities that do not own the data. Applications of HE as it relates to cloud data storage may include but are not limited to the following.

Outsourcing Storage and Computing: Users may outsource data storage and computing to third party cloud service providers with reduced risk of vulnerability or exposure of their sensitive (e.g. personally identifiable information, or PII, of their customers/clients) or proprietary (e.g. intellectual property or strategic intelligence) data. Financial Services: Security and privacy of data is crucial for financial institutions and financial service providers, from both a regulatory/compliance and consumer protection standpoint. For example, credit monitoring and reporting companies can leverage HE to store sensitive customer data in encrypted form, while simultaneously maintaining the ability to provide normal course of business services without decrypting that data. HE can protect and secure frequently queried and accessed databases or large repositories of data related to loan services, insurance services, bank transactions, or Know Your Customer (KYC) activities, among others.

Healthcare Services and Technology: In the healthcare industry, particularly within precision medicine and online medical services, the present invention provides many advantages. In the rapidly growing area of data-driven patient services (e.g. self-service medical lab testing, genomics, on-demand healthcare providers), a cloud data storage platform can be further secured by leveraging HE. From the perspective of the providers or vendors of these healthcare services, this can reduce the risk of exposure of Protected Health Information (PHI) and facilitate HIPAA compliance. From the standpoint of consumers, patients can send/receive encrypted data—via their smartphones or other devices—stored in the cloud to interact with their own data (lab results, history of treatments, etc.). With an encrypted central repository of patient data, a cloud server may securely perform advanced predictive analytics (e.g. susceptibility to genetic diseases or prescriptive health strategies) and securely transmit results back to the patient.

Blockchain and Distributed Computing. Entities need to collect data from disparate sources or locations around the world and store that data on various cloud servers, which may also be geographically dispersed. Distributed computing protocols and blockchain technology can be leveraged to harness the power of these networks of computers or servers. However, it is essential that these companies or organizations be able to use these networks (i.e. access the information or perform computations/queries on the data stored on the network), while not exposing potentially sensitive or confidential information. Here, HE can provide a layer of privacy that does not currently exist on many of these distributed networks or blockchains. Specifically, practical applications of HE in these areas include, but are not limited to: blockchain privacy: privacy of transactional information on the distributed ledger. One of the key tenets of blockchains can also be a challenge for enterprise-wide adoption of the technology. The transparency and immutability of the distributed ledger can present privacy issues for organizations that would otherwise leverage blockchain for transaction histories, smart contracts, product tracking, or other operational use cases. Identity Networks: privacy of individuals' identities across a variety of data repositories and databases, particularly those used for credit services. Financial Services: privacy of customers' data across a network of databases used for accounting services or retail financial services, such as wealth management, credit monitoring, lending, insurance or tax preparation. Hospitals or Health Organizations: secure and HIPAA-compliant collection of patient information across a variety of sources by health organizations and healthcare providers (e.g. Center for Disease Control, or CDC, collecting data from hospitals, or the World Health Organization collecting data for research). Charitable Organizations and NGO's: protection of identity, bank account, and/or payment information from donors in various geographic locations.

Internet of Things. For networks of connected physical objects (e.g. cars and home appliances) or sensors that collect data, sensitive information may be stored across these networks. These devices and sensors may be found in various physical locations and can perform designated control operations. They can provide privacy for the data collected by these sensors and can maintain integrity of control operations performed by devices. Practical examples include but are not limited to: Local and National Infrastructure: energy grids, industrial or nuclear power plant control networks, national highway networks. Smart Cities: water systems, city traffic systems, municipal security controls. Smart Vehicles: smart cars, collecting passenger data/trends, drones, self-driving cars. Smart Homes: smart refrigerators, appliances, retail security systems. Logistics: smart delivery systems (e.g., Amazon delivery).

Secure Multi-Party Computation: If two or more parties (or nodes in a network) are required to compute a common function but need to keep their respective data inputs encrypted or secret, HE can provide a method for executing these procedures.

HE provides a simple solution for private information retrieval (PIR). An example may be as follows: if Party "A" (say a cloud server, e.g. Amazon or Google) has a large database of information or data (say patient records, patent database, or criminal records), and another Party "B" wants to retrieve information from that database but does not want "A" to know what information is retrieved. The privacy of Party "B"s query must be protected, which can be facilitated using HE.

HE provides a simple solution for online bidding and voting mechanisms (online casino games, online auctions, local or national voting systems, etc.). In these scenarios, a group of two or more parties need to submit anonymous or secret bids or votes, and a separate manager (or dealer or intermediary) decides on the outcome according to preset rules. The parties and the manager may not trust one another, and the protocol should provide fairness and privacy of information. Using HE, the inputs of the parties can be encrypted and private to one another, as well as to the intermediary.

In the following description, computer readable instructions, when executed by a computer processor, cause the computer to perform a series of steps to accomplish a specific task and results in useful, concrete and tangible results. These computer readable instructions can be tied to a particular machine or apparatus with the specific purpose of executing the computer readable code for accomplishing tangible results, and represents and accomplishes the manipulation of physical data.

The detailed description that follows may be presented in terms of program procedures executed on a computer or network of computers. These procedural descriptions are representations used by those skilled in the art to most effectively convey the substance of their work to others skilled in the art. These procedures herein described are generally a self-consistent sequence of steps leading to a desired result when executed by a computer and its processor representing or resulting in the tangible manipulation of physical objects. These procedures significantly improve the operation of a computer and advances the technological art. Actual computer or executable code or computer readable code may not be contained within one file or one storage medium, but may span several computers or storage mediums. The term "server" may be hardware, software, or combination of hardware and software that provides the functionality described herein.

The present invention may be described below with reference to flowchart illustrations of methods, apparatus ("systems"), computer programs or processes, or equations that all can represent computer readable instructions according to the invention. It will be understood that each block of a flowchart illustration or equation can be implemented by a set of computer readable instructions.

Elements of the flowchart or equations and representations support combinations of computer readable instructions and/or hardware for performing the special functions, combinations of steps for performing the specified functions and program instructions for performing the specified functions. It will be understood that each block of the flowchart illustrations or equation and representation can be implemented by special purpose hardware-based computer systems that perform the specified functions, steps, or combinations of special purpose hardware or computer instructions.

This invention may be embodied in many different forms and should not be construed as limited to the embodiment set forth herein. Rather, these embodiments are provided so that this disclosure will be thorough and complete and will fully convey the scope of the invention to those skilled in the art.

The method of this invention has two major stages: data encryption for storage and homomorphic computing on encrypted data. Each client or user generates a secret key (sk), and a public key (pk), and a bootstrapping key (bk).

Data encryption for storage. The encryption schemes described below have small expansion factors but still allows for homomorphic computing (of every function) on the ciphertexts without decryption. There are two scenarios for data encryption: (1) A client (data owner) encrypts data with his secret key (sk) and send the encrypted data to cloud servers; (2) A client (data owner such as CDC) collects data from many clients or sensors that are located around the country or world, in this case, the local sensors use the public key of the data owner to perform encryption and store the encrypted data on cloud servers.

Homomorphic Computing on encrypted dada. This stage is performed by cloud servers or any third party with access to the ciphertexts and the public bootstrapping key (bk) of the data owner. The cloud servers, accessing the bootstrapping key and the encrypted data, upon a request to perform analytics of a function given in a Boolean or arithmetic circuit or a pseudo code, perform the homomorphic computing algorithm of this invention and get the analytic results in encrypted form. Then send the encrypted analytic results to the data owner. Only the data owner who has the secret key can decode the encrypted analytic results, any other party (including the cloud servers can not get any partial information on the original data nor the decoded analytic results.

Before giving more details of the schemes of this invention, some notations and preliminary are described next. Let q be a positive integer and $\mathbb{Z}_q = \mathbb{Z}/q\mathbb{Z}$, the ring of integers modulo q. For an integer $n \geq 1$, let $$\mathbb{R}_n = \mathbb{R}[x]/(x^n+1), R_n = \mathbb{Z}[x]/(x^n+1), R_{n,q} = \mathbb{Z}[x]/(x^n+1,q)$$

where $\mathbb{R}$ denotes the field of real numbers and $(x^n+1, q)$ denotes the ideal of $\mathbb{Z}[x]$ generated by $x^n+1$ and q, namely, $$(x^n+1,q) = \{u(x)(x^n+1) + v(x)q : u(x), v(x) \in \mathbb{Z}[x]\}.$$

For any polynomial $f(x) = \sum_{i=0}^{d} f_i x^i \in \mathbb{R}[x]$ and for $\ell \geq 1$, $\ell$-norm and $\infty$-norm can be defined as:

$$\|f(x)\|_\ell = \left(\sum_{i=0}^{d} |f_i|^\ell\right)^{1/\ell},$$

$$\|f(x)\|_\infty = \max_{0 \leq i \leq d} |f_i|.$$

In one example, the cases when $\ell$ $\ell = 1, 2$ and $\infty$ is used. However, the norm for $f(x) = \sum_{i=0}^{d} f_i x^i \in \mathbb{R}_n$, can be defined as follows. First find the unique $h(x) \in \mathbb{R}[x]$ so that degg $(x) < n$ and $f(x) \equiv h(x) \mod(x^n+1)$ (i.e. $h(x)$ is the remainder of $f(x)$ modulo $x^n+1$), then define $$\|f(x)\| = \|h(x)\|,$$

where the norm $\|\cdot\|$ stands for any one of the $\ell$-norm or $\infty$-norm (similarly below). For example, in $\mathbb{R}_4 = \mathbb{R}[x]/(x^4+1)$, we have $\|10x^4+x+8\|_\infty = \|x-2\|_\infty = 2$ and $$\|(x-1)^4\|_1 = \|x^4 - 4x^3 + 6x^2 - 4x + 1\|_1 = \|-4x^3 + 6x^2 - 4x\|_1 = 14.$$

For any real number c and for any $u(x), v(x) \in \mathbb{R}_n$, the relationship $\|cu(x)\| = |c| \|u(x)\|$, and if $u(x) \equiv v(x) \mod(x^n+1)$ then $\|u(x)\| = \|v(x)\|$ can be used. Also, the usual triangle inequality still holds, that is $$\|u(x) + v(x)\| \leq \|u(x)\| + \|v(x)\|.$$

For $m \geq 1$, elements in $R_n^m$ are viewed as row vectors of length m, similarly for $\mathbb{R}_n^m$ and $R_{n,q}^m$. For $u = (u_1(x), \ldots, u_m(x)) \in R_n^m$, it can be defined $$\|u\|_p = \left(\sum_{i=1}^{m} \|u_i(x)\|_p^p\right)^{1/p},$$

$$\|u\|_\infty = \max_{1 \leq i \leq m} \|u_i(x)\|_\infty.$$

Also, for any real number z, the function $[z]$ denotes the integer closest to z. For example, $[1.6] = 2$, $[-0.4] = 0$, however, $[-1.5] = -2$ or $-1$. For any vector $v \in \mathbb{R}^n$ (or any polynomial $v \in \mathbb{R}_n$ with degree $< n$), $[v]$ can be the vector (or the polynomial) when $[\cdot]$ is applied to each entry (or each coefficient) of v.

Several probabilistic distributions can be used. A random variable on $\mathbb{Z}_q$ is uniform random if it takes each element of $\mathbb{Z}_q$ with equal probability, namely $1/q$, and a random variable X on $\mathbb{Z}_q^n$ or $R_{n,q}$ is uniform random if each component (or each coefficient) is independent and uniform random on $\mathbb{Z}_q$. For any real number $b > 0$, by b-bounded uniform random variable X on $\mathbb{Z}$, can mean X is uniform random on the integers i with $|i| \leq b$, and X never takes any other value. A random variable X on $\mathbb{R}$ is called Gaussian with parameter $\alpha > 0$ if its density function is $$\rho_\alpha(x) = \frac{1}{\alpha} \exp(-\pi(x/\alpha)^2),$$

$y \in \mathbb{R}$.

A Gaussian random variable with parameter $\alpha$ has expected value 0 and standard deviation $\alpha/\sqrt{2\pi}$. A random variable X over $\mathbb{R}$ is called sub-Gaussian with parameter $\alpha$ if $E(X) = 0$ and its moment generating function satisfies $$E[\exp(2\pi t X)] \leq \exp(\pi \alpha^2 t^2), t \in \mathbb{R}.$$

If X is sub-Gaussian with parameter $\alpha$, then its tails are dominated by a Gaussian of parameter, i.e., $$\text{Prob}(|X| \geq t) \leq 2 \exp(-\pi(t/\alpha)^2), \text{ for all } t \geq 0.$$

A b-bounded random variable with expected value 0 is always sub-Gaussian with parameter b, and a sum of independent sub-Gaussian random variables on $\mathbb{R}$ is still sub-Gaussian. It should be noted that a sum of independent sub-Gaussian random variables on $\mathbb{Z}_q$ can be nearly uniform random when the number of variables is large enough.

In one example, let q>1 be any integer. Each probability distribution on $\mathbb{R}$ induces a discretized distribution on $\mathbb{Z}_q$ as follows. Pick a random number $z \in \mathbb{R}$ according to the given distribution, compute y:=[qz] mod q so that y is between −q/2 and q/2, and return y. For example, when q=11, [q·1.6]=[17.6]=18≡−4 mod q, however, [q·(−1.5)]=[−16.5]=−17 or −16 (then reduce by q). The Gaussian distributions on $\mathbb{Z}_q$ can be used. For a Gaussian random variable X with parameter $\alpha$, its discretized Gaussian over $\mathbb{Z}_q$ is sub-Gaussian with parameter $c\alpha q$ for some small constant $c \geq 1$.

Let $\chi$ be a probabilistic distribution on Z, and let $s \in \mathbb{Z}_q^n$ be an arbitrary vector (corresponding to a secret key of a user). An LWE sample is of the form (a, b) where $a \in \mathbb{Z}_q^n$ is uniform random and b=<s, a>+e mod q with $e \in \mathbb{Z}$ being randomly chosen according to the distribution $\chi$. The LWE problem over $\mathbb{Z}_q$ is to find s given LWE samples in $\mathbb{Z}_q^n \times \mathbb{Z}_q$ where the number of samples can be as large as one desires, but should be bounded by a polynomial in nlog(q). The decision version of the LWE problem is to distinguish LWE samples from samples with uniform distribution on $\mathbb{Z}_q^n \times \mathbb{Z}_q$. $\chi$ can be the error distribution of the LWE problem.

By Regev's theorem ("On lattices, learning with errors, random linear codes, and cryptography", Proceedings of the 37th Annual ACM Symposium on Theory of Computing, Baltimore, Md., USA, May 22-24, 2005, 2005, pp. 84-93; "On lattices, learning with errors, random linear codes, and cryptography", J. ACM 56 (2009), no. 6, 34:1-34:40), if the error distribution $\chi$ is a discretized Gaussian distribution on $\mathbb{Z}_q$ with parameter $\alpha > 0$ and $\alpha q \geq 2\sqrt{n}$, then solving the LWE problem over $\mathbb{Z}_q$ is at least as hard as solving some approximate shortest vector problem for lattices of dimension n (under quantum reduction).

The quantum reduction requirement can be removed and solving n-dimensional LWE problem over $\mathbb{z}_q$ can be at least as hard as solving a worst-case lattice problem in dimension $\sqrt{n}$. It is an open problem whether $\sqrt{n}$ in the lattice problem can be replaced by O(n), which is desirable in applications in most lattice-based cryptosystems. Also, a binary-LWE problem over $\mathbb{F}_q$ is the LWE-problem over $\mathbb{F}_q$ where the secret vector $s \in \mathbb{F}_q^n$ is a vector in $\{0,1\}^n$. This invention can use binary secret vectors s.

The average complexity of solving LWE problem is bounded below by the worst-case complexity of lattice problems. Hence LWE problem is believed to be hard on average, thus forms the security foundation of many post-quantum cryptosystems (that are secure even if quantum computers can be built). There are two minor problems in using Gaussian distributions in practice: one is that Gaussian distribution is relatively expensive to generate (compared to bounded uniform distributions); another is that there is a small probability of decoding failure for new ciphers computed from bootstrapping. The FHE scheme of the present invention never have decoding failure for both fresh and computed ciphertexts.

This invention can use bounded uniform distributions or truncated discrete Gaussian distributions for errors, that can have a given bound $\tau > 0$ and can choose e randomly in $[-\tau, \tau]$. In the public keys and bootstrapping keys, the $\tau$ will be about $D_r$, and in the fresh ciphertexts of the original data, $\tau = D_r$. Also, in all the ciphertexts in the bootstrapping operations or from homomorphic computing of an arbitrary function, the error size can be bounded by $\tau = D_r$. The error width $2D_r = O(n)$ is much bigger than those used in all the proposed homomorphic schemes in the prior art, and is also much bigger than $2\sqrt{n}$. Hence security is ensured by Regev's theorem when n is large. In the rest of the invention, when we say the value of a variable x is chosen or picked at random with $|x| \leq \tau$, we mean that x is chosen according to bounded uniform random or truncated discrete Gaussian distribution bounded by $\tau$.

A cryptosystem based on the LWE problem is proprosed by Regev (2005). Let $s \in \mathbb{Z}_q^n$ be a secret key and $1 \leq \tau < D_q/2$ where $D_q$ is some constant. To encrypt a message bit $x \in \{0,1\}$, pick $a \in \mathbb{Z}_q^n$ uniform randomly and compute $$b := <s, a> + e + xD_q \mod q,$$

where $e \in [-\tau, \tau]$ is uniform random or truncated Gaussian. Then (a,b) is a ciphertext for x, denoted as $$E_s(x) = (a,b) \in \mathbb{Z}_q^n \times \mathbb{Z}_q,$$

called an LWE cipher of x. To decrypt a ciphertext $E_s(x) =$ (a,b), compute $$b_1 := b - <s, a> \mod q,$$

where $-q/2 < b_1 \leq q/2$, and $x_1 := \lfloor b_1/D_q \rceil$. Then $x = x_1$. The reason is that $$b_1 \equiv b - <s, a> \equiv e + xD_q (\mod q),$$

and $|e| \leq \tau < D_q/2$ implies that $-q/2 < e + xD_q \leq q/2$, hence $b_1 = e + xD_q$ (as real numbers) and $b_1/D_q = e/D_q + x$ with $|e/D_q| < 1/2$.

In the following, this invention uses a binary $s \in \{0,1\}^n$ with Hamming weight $\rho = n$ or $n/8$. Ring learning with error (RLWE) problem is introduced to get more efficient encryption schemes by Lyubashevsky, Peikert and Regev ("On ideal lattices and learning with errors over rings", Advances in cryptology—EUROCRYPT 2010, Lecture Notes in Comput. Sci., vol. 6110, Springer, Berlin, 2010, pp. 1-23). Let $$R_n = \mathbb{Z}[x]/(x^n+1), \text{ and } R_{n,q} = \mathbb{Z}[x]/(x^n+1, q),$$

that is, polynomials are computed modulo $x^n+1$ and all the coefficients modulo q. Each element of $R_{n,q}$ (or $R_n$) is of the form $a(x) = \sum_{i=0}^{n-1} a_i x^i$, where $a_i \in \mathbb{Z}$, representing an n-tuple $(a_0, a_1, \ldots, a_{n-1}) \in \mathbb{Z}_q^n$ (or in $\mathbb{Z}^n$). Let $s(x) \in R_{n,q}$ be any secret key. An RLWE sample is of the form $(a(x), b(x)) \in R_{n,q}^2$ where $a(x) \in R_{n,q}$ is uniform random and $$b(x) = s(x)a(x) + e(x) \mod(x^n+1, q),$$

where $e(x) \in R_n$ with each coefficient small and random (according to certain distribution). An RLWE sample $v \in R_{n,q}^2$ is said to have error size $\tau$ if $$v(-s(x), 1)^t \equiv e(x) \mod(x^n+1, q), \quad (1)$$

where $e(x) \in R_n$ and $\|e(x)\|_\infty \leq \tau$. The RLWE problem over $\mathbb{Z}_q$ is to find s(x) given many RLWE samples where each sample is random and independent. Let $m(x) = \sum_{i=0}^{n-1} m_i x^i$ where $m_i \in \{0,1\}$, which represents an n-bit message. An RLWE cipher for m(x) with error size $\tau$ is of the form $$RE_s(m(x)) = v + m(x)D_q(0,1) \in R_{n,q}^2 \quad (2)$$

where $v \in R_{n,q}^2$ is an RLWE sample with error size $\tau$. Suppose $RE_s(m(x)) = (a(x), b(x))$. Then $$b(x) - s(x)a(x) \equiv m(x)D_q + e(x) \mod(x^n+1, q),$$

where $e(x) \in R_n$ is random with $\|e(x)\|_\infty \leq \tau$. For decoding an RLWE cipher with error $\tau < D_q/2$, one can recover $m(x)$ from a ciphertext by computing $b(x) - s(x)a(x)$, after reduced modulo $(x^n+1, q)$.

Details of the various components of this invention are described next. First for Key Generations. Let n be a power of 2, $n \geq \rho \geq n/8$, $r \geq 16\rho$, and $$q \geq rn, Q = O(n^4 \log_2 n), B \geq \sqrt{Q}, m = r/2.$$

Here one can choose $\rho = n/8$ and $m = r/2 = n$ which is the optimal choice so that the cost for the bootstrapping processor (BP) below is minimized. Let $$R_n = \mathbb{Z}[x]/(x^n+1), R_{n,q} = \mathbb{Z}[x]/(x^n+1,q), R_{m,Q} = \mathbb{Z}[x]/(x^m+1,Q)$$

and $$D_r = \lfloor r/4 \rfloor, D_q = \lfloor q/4 \rfloor, D_Q = \lfloor Q/4 \rfloor, \tilde{D}_Q = \lfloor Q/8 \rfloor.$$

Each client generates a secret key, a public key and a bootstrapping key as follows. For the secret key (sk), pick $s = (s_0, s_1, \ldots, s_{n-1}) \in \{0,1\}^n$ uniform randomly with Hamming weight $\rho$ or less, and let $s(x) = \sum_{i=0}^{n-1} s_i x^i$, representing the n-bit secret key of the client. A corresponding public key in $R_{n,q}^2$ can be generated as $pk = (k_0(x), k_1(x))$ where $k_0(x) \in R_{n,q}$ is chosen uniform randomly and $$k_1(x) := k_0(x)s(x) + e(x) \bmod (x^n+1, g)$$

with $e(x) \in R_n$ being chosen bounded uniform randomly or truncated discrete Gaussian so that $\|e(x)\|_\infty < D_q/(50n)$.

For a bootstrapping key $bk = (C_0, C_1, \ldots, C_{n-1})$, we give two types for $C_i$, and other variations are possible. In the first type, let $B = \lceil \sqrt{Q} \rceil$, each $C_i \in R_{m,Q}^{4 \times 2}$ is generated as follows. For each $0 \leq i \leq n-1$ the following steps can be performed:

pick $a_{ji}(x) \in R_{m/Q}$ uniform randomly (and independently) for $1 \leq j \leq 4$, pick $e_{ji}(x) \in R_m$ bounded randomly and independently with $$\|e_{ji}(x)\|_\infty \leq 2\sqrt{n}, 1 \leq j \leq 4,$$

Determine $b_{ji}(x) := a_{ji}(x)s(x) + e_{ji}(x) \bmod (x^m+1, Q)$ for $1 \leq j \leq 4$, and set $$C_i := \begin{pmatrix} a_{1i}(x) & b_{1i}(x) \\ a_{2i}(x) & b_{2i}(x) \\ a_{3i}(x) & b_{3i}(x) \\ a_{4i}(x) & b_{4i}(x) \end{pmatrix} + s_i G \bmod Q, \text{ where}$$

$$G = \begin{pmatrix} 1 & 0 \\ B & 0 \\ 0 & 1 \\ 0 & B \end{pmatrix}.$$

In the second type, let $B = \lceil \sqrt{Q \log_2 n} \rceil$, each $C_i \in R_{m,Q}^{2 \times 2}$ is generated as follows (with $a_{ij}(x), b_{ij}(x)$ generated similarly as above):

$$C_i := \begin{pmatrix} a_{1i}(x) & b_{2i}(x) \\ a_{2i}(x) & b_{2i}(x) \end{pmatrix} + s_i B G_s \bmod Q, \text{ where}$$

$$G_s = \begin{pmatrix} 0 & -s(x) \\ 0 & 1 \end{pmatrix}.$$

This second type is preferred since the size of the bootstrapping key will be reduced by half and the bootstapping processor (BP) will be two times faster.

It is advantageous to use a pseudo-random number generator P in order to reduce ciphertext size under encryption with private keys and to reduce the size of public and bootstrapping keys. P can be a function that can expand any n-bit sequence $u \in \{0,1\}^n$ (deterministically) into a sequence of 0's and 1's of length $n \lceil \log_2(r) \rceil$ (or $n \lceil \log_2(Q) \rceil$) denoted by $P(u)$. The sequence $P(u)$ can be uniquely converted into a polynomial in $R_{n,r}$ (or $R_{m,Q}$) denoted by $P(u, x)$. The function P needs not to have a strong cryptographic property, but only needs to be statistically uniform, that is, when $u \in \{0,1\}^n$ is uniform random, $P(u,x)$ should be nearly uniform random in $R_{n,r}$ (or $R_{m,Q}$).

Using a pseudo-random number generator P, one can reduce the size of pk and bk as follows. For each desired instance of $a(x)$, one can pick a random $u \in \{0,1\}^n$ and use P to expand u into a polynomial $a(x)$ in a desired ring, then store u in place of $a(x)$. This will reduce the size of pk and bk to half, so saving storage in practice.

In one embodiment of encryption, the invention can use private keys and, in another case, can use public keys. When using private keys, the steps are shown in the following scheme:

| | Encryption under private key: $RE_s(m(x))$ |
|---|---|
| Input: | $s(x) \sum_{i=0}^{n-1} s_i x^i$, where $s_i \in \{0,1\}$, an n-bit secret key, |
| | $m(x) = \sum_{i=0}^{n-1} m_i x^i$, where $m_i \in \{0,1\}$, an n-bit message, |
| | $t := \lceil \log_2(r) \rceil - 1$, hence $2^t < r \leq 2^{t+1}$, |
| | $P: \{0,1\}^n \to \{0,1\}^{n(t+1)}$, a pseudo-random number generator. |
| Output: | $(u, v) \in \{0,1\}^n \times \{0,1\}^{5n}$ |
| Step 1. | Pick $u \in \{0,1\}^n$ uniform randomly, and compute $a(x) := P(u, x) \in R_{n,r}$. |
| Step 2. | Pick $w(x) \in R_n$ uniform randomly with $\|w(x)\|_\infty \leq D_r/8$, and compute $b_1(x) := a(x)s(x) + w(x) + m(x)D_r \bmod(x^n + 1, r)$ (so that each coefficient of $b_1(x)$ is between 0 and $r - 1$). |
| Step 3. | Taking the highest 5 bits for each coefficient of $b_1(x)$: $$b(x) := \left\lfloor \frac{b_1(x)}{2^{t-4}} \right\rfloor.$$ Let $v \in (\{0,1\}^5)^n$ denote the bit representation of $b(x)$. |
| Step 4. | Return $(u,v)$. |

Using the above steps with $r=2^{t+1}$, and let $(a(x), b(x)) \in R_{n,r}^2$ be the unique pair of polynomials represented by (u, v) as computed in Steps 1 and 3. Then there exists $w_3(x) \in R_n$ with $\|w_3(x)\|_\infty < D_r/4$ so that $$2^{t-4}b(x) - s(x)a(x) \equiv W_3(x) + m(x)D_r \mod(x^n+1, r).$$

In particular, the ciphertext (u, v) returned in Step 4 has 6n bits and represents an RLWE cipher $RE_s(m(x))$ with error size $<D_r/4$. Hence the cipher expansion of encryption under private keys is only 6. For the proof of this result and the claimed results below, we refer the reader to the paper (Shuhong Gao, "Efficient Fully Homomorphic Encryption" (2018). https://eprint.iacr.org/2018/637).

In another embodiment of encryption with private key, one can let $m(x) = \sum_{i=0}^{n-1} m_i x^i$ where $m_i \in \{0,1\}^k$, so representing a block of length n with each entry having k bits information. Then one can encode m(x) as above in a similar fashion with $r = 2^{t+1} \geq 2^{k+6}\sqrt{n}$. In this case, each output cipher has (6+k)n bits. When k=4, the cipher expansion of encryption under private keys is reduced to 2.5. For the proof of this result and the claimed results below, we refer the reader to the paper (Benjamin M. Case, Shuhong Gao, Gengran Hu, and Qiuxia Xu, "Fully Homomorphic Encryption with k-bit Arithmetic Operations" (2019). https://eprintiacrorg/2019/521).

For encryption using public keys, the steps are presented below:

---

Encryption under public key: $RE_{pk}(m(x))$

Input:    $pk = (k_0(x), k_1(x)) \in R_{n,q}^2$,
         $m(x) = \sum_{i=0}^{n-1} m_i x^i$: an n-bit message where $m_i \in \{0,1\}$,
         $t := \lceil \log_2(r) \rceil - 1$, hence $2^t < r \leq 2^{t+1}$.
Output:   $(a(x), b(x)) \in R_{n,r}^2$
Step 1.    Pick $u(x) \in R_n$ with each coefficient random in $\{-1,0,1\}$,
         Pick $w_1(x) \in R_n$ randomly with $\|w_1(x)\|_\infty \leq 16\, D_q/(50r)$,
         Pick $w_2(x) \in R_n$ randomly with $\|w_2(x)\|_\infty \leq D_q/150$.
Step 2.    Compute:
         $a_1(x) := k_0(x)u(x) + w_1(x) \mod(x^n+1, q)$,
         $b_1(x) := k_1(x)u(x) + w_2(x) + m(x)D_q \mod(x^n+1, q)$.
         (Both $a_1(x)$ and $b_1(x)$ have coefficients in $[0, q-1]$.)
Step 3.    Modulus reduction and rounding:

$$a(x) := \left\lfloor \frac{r}{q} a_1(x) \right\rfloor, \quad b(x) := \left\lfloor \frac{r}{2^{t-5}q} b_1(x) \right\rfloor.$$

(Each coefficient of b(x) is in $[0, 2^6 - 1]$, hence has 6 bits.)
Step 4.    Return (a(x), b(x)).

---

Suppose $s \in \{0,1\}^n$ with Hamming weight at most $\rho$, $r = 2^{t+1} \geq 254$, $r \geq 16\rho$, $q \geq 32n^2$. Let $(a(x), b(x)) = RE_{pk}(m(x)) \in R_{n,r}^2$ be any ciphertext output by Step 4 above. Then there exists some $w_3(x) \in R_n$ with $\|w_3(x)\|_\infty < D\_r/4$ so that $$2^{t-5}b(x) - s(x)a(x) \equiv w_3(x) + m(x)D_r \mod(x^n+1, r).$$

In particular, when $r = 16\rho = 2n$, each ciphertext $RE_{pk}(m(x))$ has $n(7+\log_2(n))$ bits, so the cipher expansion of encryption under public key is $7 + \log_2 n$, which is 20 or less when $n \leq 2^{13} = 8192$.

In another embodiment of encryption with public keys, one can let $m(x) = \sum_{i=0}^{n-1} m_i x^i$ where $m_i \in \{0,1\}^k$, so representing a block of length n with each entry having k bits information. Then encoding m(x) in a similar fashion with $r = 2^{t+1} \geq 2^{k+6}\sqrt{n}$. In this case, each output cipher has $(2k+12+(\log_2 n)/2)n$ bits. When k=4, the cipher expansion of the scheme under public keys is reduced to 6.7 or less when $n \leq 2^{13} = 8192$.

The ciphertexts above from encryption with both private and public keys represent RLWE ciphers $(a(x), b(x)) \in R_{n,r}^2$ all with error size $<D_r/4$ for the same r. These ciphertexts are stored in cloud servers or networks of computers. Since the cipher expansion is small, the storage of encrypted data is cost effective in practice.

One embodiment of homomorphic computing goes as follows. Let $x \in \{0,1\}^L$ represent a data of a client where L can be large (say billions). The data x is encrypted in blocks of length n using the secret or public key of the client, and stored as a collection of RLWE ciphers in $R_{n,r}^2$ as above. Let $f: \{0,1\}^L \to \{0,1\}^M$ be an arbitrary function, given as a circuit (Boolean or arithmetic modulo some integer). We want to compute the ciphertext for $y = (y_1, \ldots, y_M) = f(x)$ using the bootstrapping key published by the client.

We first do unpacking: from each RLWE cipher in $R_{n,r}^2$ of x, extract n LWE ciphers in $\mathbb{Z}_r^n \times \mathbb{Z}_r$, all with error size $<D_r/4$ for the individual bits of x. For instance, take any RLWE cipher $RE_s(z(x)) = (a(x), b(x)) \in R_{n,r}^2$ with error size $<D_r/4$ where $z(x) = \sum_{i=0}^{n-1} z_i x^i$ with $z_i \in \{0,1\}$, and $a(x) = \sum_{i=0}^{n-1} a_i x^i$ and $b(x) = \sum_{i=0}^{n-1} b_i x^i$, we have n LWE ciphers:

$$E_s(z_i) = (a_i, a_{i-1}, \ldots, a_0, -a_{n-1}, \ldots, -a_{i-1}, b_i) \in \mathbb{Z}_r^n \times \mathbb{Z}_r$$

for $i = 0, 1, \ldots, n-1$, all with error size $<D_r/4$.

Next we describe the functionality of bootstrapping processor (BP). With a bootstrapping key (bk), for any given LWE ciphers $$v_1 = E_s(z_1), v_2 = E_s(z_2) \in \mathbb{Z}_r^n \times \mathbb{Z}_r,$$

both with error size $<D_r/4$, where $z_1, z_2 \in \{0,1\}$, BP computes three LWE ciphers:

$$c_1 = E_s(z_1 \wedge z_2), c_2 = E_s(z_1 \vee z_2), c_3 = E_s(z_1 \oplus z_2)$$

all in $\mathbb{Z}_r^n \times \mathbb{Z}_r$ with error size $<D_r/4$, where $z_1 \wedge z_2 = z_1 \cdot z_2$ (AND gate), $z_1 \vee z_2 = z_1$ or $z_2$ (OR gate) and $x_1 \oplus x_2 = x_1 + x_2$ (mod 2) (XOR gate, exclusive or). The new ciphertexts are always valid, so one or more of the new ciphertexts can serve as part of the input of BP in further homomorphic computing.

In another functionality of BP, when $z_1, z_2 \in \{0,1\}^k$ have k bits, BP can compute ciphertexts of more complicated operations including but not limited to $$z_1 + z_2 \mod p, z_1 - z_2 \mod p, z_1 \cdot z_2 \mod p, z_1^i \mod p,$$

where $p \leq 2^k$ can be any positive integer. BP can also compute ciphertext for $\max(0, z_1)$ which is useful in deep learning. Proofs of these results can be found in the paper (Benjamin M. Case, Shuhong Gao, Gengran Hu, and Qiuxia Xu, "Fully Homomorphic Encryption with k-bit Arithmetic Operations" (2019). https://eprint.iacr.org/2019/521). In this exemplary embodiment, the function f can be given as an arithmetic circuit where the gates represents operations modulo a fixed number p.

Figure 3:
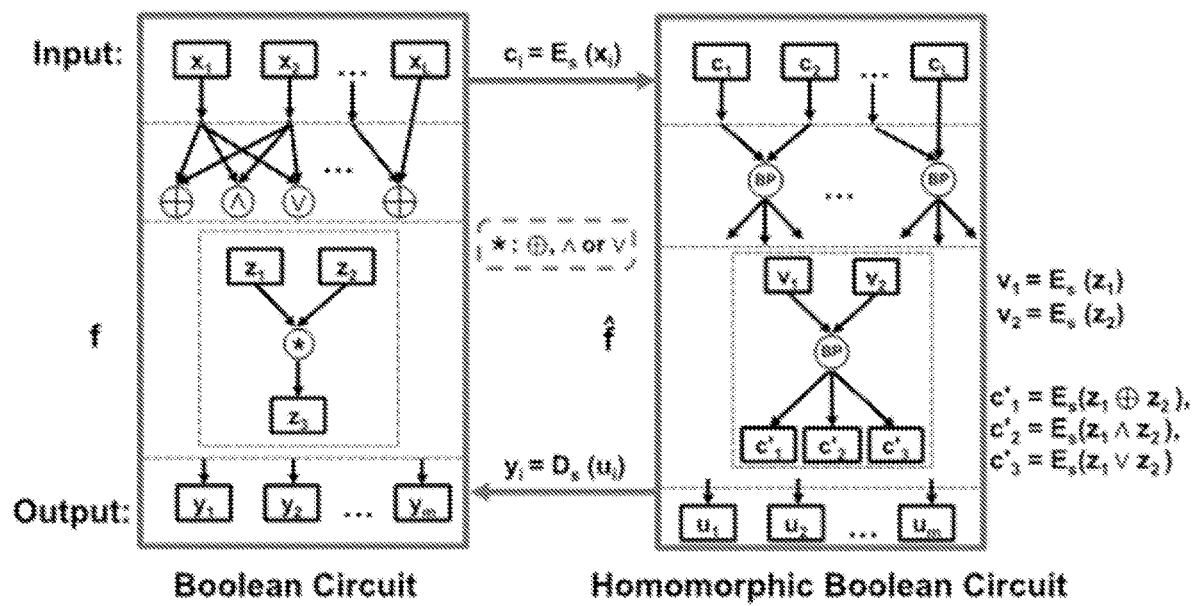
FIG. 3 is a diagram of aspects of the invention.

In order to compute a general function f on the data $x = (x_1, x_2, \ldots, x_L)$, one just follows the gates of the circuit of f from input LWE ciphertexts to output LWE ciphertexts. Finally, do packing: for each group of n LWE ciphers for the bits of the output $y = f(x)$, pack them into one RLWE cipher in $R_{m,r}^2$ where $m = r/2$. Return the list of RLWE ciphers as the encrypted result $y = f(x)$. This embodiment of homomorphic computing algorithm of this invention is illustrated by the diagram shown in FIG. 3. Another embodiment is when the function f is given as a pseudo code and can convert the code into a sequence of bit operations and the homomorphic computing algorithm performs BP on each bit operation of the sequence of bit operations.

Figure 4:
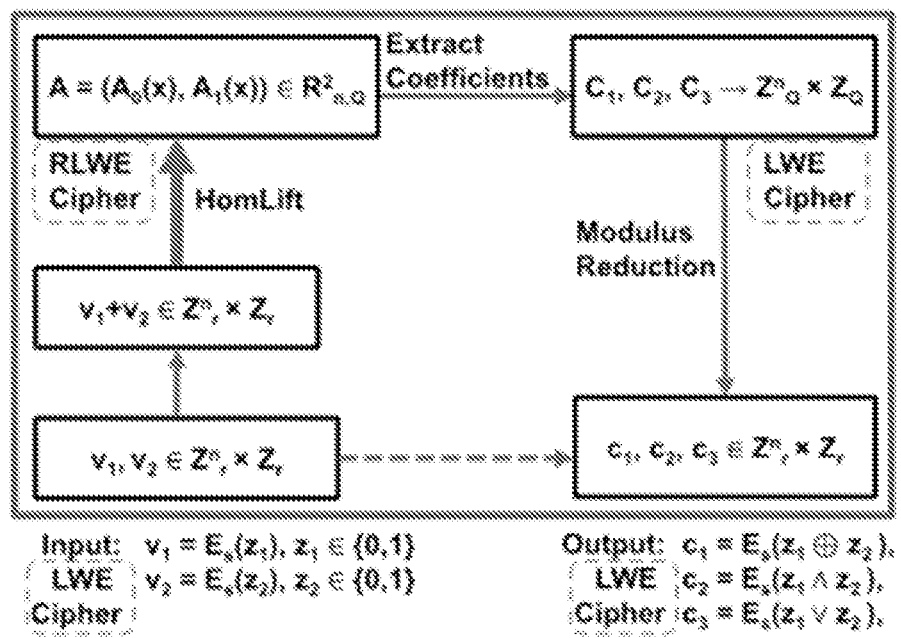
FIG. 4 is a diagram of aspects of the invention.

In more details of the bootstrapping processor (BP), one first perform homomorphic lifting to lift LWE ciphers modulo r to LWE ciphers modulo Q, next perform limited number of operations on the LWE ciphers modulo Q, then perform modulus reduction to reduce LWE ciphers modulo Q to LWE ciphers modulo r so that the error size is still $<D_r/4$. This embodiment of BP is illustrated in the diagram shown in FIG. 4.

Now more details on the steps of BP. Modulus reduction is performed so that an LWE cipher over $\mathbb{Z}_Q$ can be converted to an LWE cipher over $\mathbb{Z}_r$ where r is much smaller than Q. Here we show how precisely the error size changes, depending only on the entropy (i.e. the bit size) of s. Let s, $a \in \mathbb{Z}_Q^n$, $e \in \mathbb{Z}$ with $|e| \leq \tau$, $x \in \{0,1\}$, $D_r = \lfloor r/4 \rfloor$, $D_Q = \lfloor Q/4 \rfloor$ and $$b \equiv <s,a> + e + xD_Q \pmod{Q}.$$

Let $b' = \lfloor rb/Q \rfloor$, $a' = \lfloor ra/Q \rfloor$, computed component wise. Suppose $s \in \{0,1\}^n$ has Hamming weight $\rho$, $Q \geq 4r$, and $Q \geq 2rt/(\rho-3)$. Then $$b' \equiv <s,a'> + e' + xD_r \pmod{r},$$

for some $e' \in \mathbb{Z}$ with $|e'| < \rho$. Note that $\rho \leq D_r/4$ whenever $r \geq 16\rho$.

Homomorphic lifting is most expensive among all the operations. It uses a group homomorphism from the additive group of $\mathbb{Z}_r$ to the multiplicative group $\{1, x, \ldots, x^{m-1}, -1, -x, \ldots, -x^{m-1}\}$ of the ring $R_{m,Q} = \mathbb{Z}[x]/(x^m+1, Q)$ where $m = r/2$, mapping $u \in \mathbb{Z}_r$ to $x^u$. We next describe two external products that are used for homomorphic lifting, corresponding to the two types of bootstrapping keys.

For the first external product and its corresponding GSW cipher, we follow the approach by Gentry, Sahai and Waters ("Homomorphic encryption from learning with errors: Conceptually-simpler, asymptotically-faster, attribute-based", Advances in Cryptology, CRYPTO 2013, Springer, 2013, pp. 75-92). Let B and $\ell$ be positive integers so that $B\ell \geq Q$ (for instance $\ell = 2$) and let $$g = (1, B, \ldots, B^{\ell-1}).$$

Every element $a \in \mathbb{Z}_Q$ can be represented as $$a = a_0 + a_1 B + \ldots + a_{\ell-1} B^{\ell-1} = (a_0, a_1, \ldots, a_{\ell-1}) g^t$$

where $a_i \in \mathbb{Z}$ has small size. For example, let $-B/2 < a_i \leq B/2$, then $(a_0, a_1, \ldots, a_{\ell-1})$ is unique. This is advantageous where new ciphertexts from homomorphic computing do not need to be random. There are also applications (e.g. zero knowledge proof) where it is important that new ciphertexts are uniformly random. Hence we shall allow $|a_i|$ to be as big as 2B.

For instance, for $0 \leq i \leq \ell-1$, pick $x_i \in \mathbb{Z}$ with $|x_i| \leq 3B/2$ uniform randomly and independently, and let $$a - (x_0 + x_1 B + \ldots + x_{\ell-1} B^{\ell-1}) \equiv y_0 + y_1 B + \ldots + y_{l-1} B^{l-1} \pmod{Q},$$

where $|y_i| \leq B/2$ for $0 \leq i \leq \ell-1$. Set $a_i = x_i + y_i$ for $0 \leq i \leq \ell-1$. Then $(a_0, a_1, \ldots, a_{\ell-1})$ is a random solution to $$a \equiv a_0 + a_1 B + \ldots + a_{\ell-1} B^{\ell-1} \pmod{Q},$$

with $|a_i| \leq 2B$ for $0 \leq i \leq \ell-1$.

We can extend this to any list of elements in $\mathbb{Z}_Q$. Thus every polynomial $a(x) \in R_{m,Q}$ can be written as $a(x) = a_0(x) + a_1(x) B + \ldots + a_{\ell-1}(x) B^{\ell-1} = (a_0(x), a_1(x), \ldots, a_{\ell-1}(x)) g^t$ where $a_i(x) \in R_m$ is bounded uniform random with $\|a_i(x)\|_\infty \leq 2B$ for $0 \leq i \leq \ell-1$. We define $$G = \begin{pmatrix} g^t & 0 \\ 0 & g^t \end{pmatrix}$$

an $(2\ell) \times 2$ matrix, called a gadget matrix. Then each $(a(x), b(x)) \in R_{n,q}^2$ can be written as $$(a(x), b(x)) = u(x) G \qquad (3)$$

where $u(x) \in R_n^{2\ell}$ is random with $\|u(x)\|_\infty \leq 2B$. We define $$(a(x), b(x)) \triangleleft G^{-1} = u(x).$$

Note that G need not be a square matrix, so it has no inverse so that we can use $G^{-1}$ as an operator that acts from right on $(a(x), b(x))$, a row vector of two polynomials with coefficients in $\mathbb{Z}_Q$ (of large size), to get $u(x) = (a(x), b(x)) \triangleleft G^{-1}$, a random row vector of $2\ell$ polynomials each with coefficients at most 2B (of small size). The advantages is that this balances the elements of size and dimension. For example, when B=3 and $\ell = 4$, we have $$G = \begin{pmatrix} 1 & 3 & 3^2 & 3^3 & 0 & 0 & 0 & 0 \\ 0 & 0 & 0 & 0 & 1 & 3 & 3^2 & 3^3 \end{pmatrix}^t,$$

and $(5+35x, -14) \triangleleft G^{-1} = (-1-x, -1, 1+x, x, 1, 1, 1, -1) \in R_n^8$. since $5 = 3^2 - 3 - 1$, $35 = 3^3 + 3^2 - 1$, and $-14 = -3^3 + 3^2 + 3 + 1$. Note that we have $$(v \triangleleft G^{-1}) G = v, \text{ for every } v \in R_{m,Q}^2, \qquad (4)$$

which can be advantageous concerning bootstrapping as described below.

For any row vector $v \in R_{m,Q}^2$ and any $A \in R_{m,Q}^{2\ell \times 2}$ (which denotes $(2\ell) \times 2$ matrices with entries in $R_{m,Q}$), their external product is defined as $$v \otimes A = (v \triangleleft G^{-1}) A \in R_{m,Q}^2,$$

which is a random vector in $R_{m,Q}^2$, since $v \triangleleft G^{-1}$ is a random row vector of length $2\ell$ and A is an $(2\ell \times 2)$ matrix. This definition can be extended to define product of any two (k$\ell$)×k matrices (to get another (k$\ell$)×k matrix). From the definition, the external product can be right distributive, that is, for any two matrices A, $B \in R_{m,Q}^{(2\ell) \times 2}$, we can have $$v \otimes (A+B) \equiv v \otimes A + v \otimes B \pmod{x^m+1, Q},$$

where all three terms use the same $v \triangleleft G^{-1}$. However, they are not equal if one computes each term independently (unless $v \triangleleft G^{-1}$ is deterministic). Also, it is not left distributive, i.e., for two vectors $v_1, v_2 \in R_{m,Q}^2$, $$(v_1 + v_2) \otimes A \not\equiv v_1 \otimes A + v_2 \otimes A \pmod{x^m+1, Q},$$

in general, since the operator $G^{-1}$ is not linear when acting on v.

For the gadget matrix G, one can define a corresponding GSW cipher as follows. Let $s(x) = \Sigma_{i=0}^{n-1} s_i x^i$, where $s_i \in \{0, 1\}$ representing an n-bit secret key of a client. For any $z(x) \in R_m$ (such as with small coefficients), a GSW cipher for $z(x)$ with error size T is of the form $$GSW_s(m(x)) = A + z(x) G \in R_{m,Q}^{(2\ell) \times 2} \qquad (5)$$

where $A \in R_{m,Q}^{2\ell \times 2}$ and each row of A is an RLWE sample (chosen independent randomly) so that $$A(-s(x), 1)^t \equiv w(x) \bmod(x^m+1, Q)$$

where $w(x) \in R_m^{2\ell}$ with $\|w(x)\|_\infty \leq \tau$. An RLWE cipher for $z(x)$ with error size $\tau_1$ is of the form $$RE_s(m(x)) = v + z(x) D_Q(0,1) \in R_{m,Q}^2 \qquad (6)$$

where $v \in R_{m,Q}^2$ is an RLWE sample so that $v(-s(x), 1)^t \equiv e(x) \bmod(x^m+1, Q)$, where $e(x) \in R_m$ with $\|e(x)\|_\infty \leq \tau_1$.

Let $z_0, z_1 \in R_n$ be any two polynomials. For any $RE_s(z_0)$ with error size $\tau$ and any $GSW_s(z_1)$ with error size $\tau_1$, we have $$RE_s(z_0) \otimes GSW_s(z_1) = RE_s(z_0 z_1) \in RE_s(z_0 z_1),$$

and has error size at most $\tau \|z_1\|_1 + 4Bm\ell\,\tau_1$.

For the second type external product and its corresponding GSW cipher, let $r=2\rho=2n$ and $B=\lceil\sqrt{Q\log_2 n}\rceil$ where $m=r/2=n$. We first define a rounding function Rd on the ring $R_{n,Q}$. For any polynomial $a(x) \in R_{n,Q}$, let $[a(x)]_Q$ denote the polynomial obtained from $a(x)$ modulo $Q$ so that each of its coefficient is between $-Q/2$ and $Q/2$, and define $$Rd(a(x)) = \left\lfloor \frac{[a(x)]_Q}{B} \right\rceil.$$

Let $a_1(x) = Rd(a(x))$ and $a_0(x) = a(x) - a_1 B$, both in $R_n$. Then we have $$a(x) = a_0(x) + a_1(x)B,$$

with $\|a_1(x)\|_\infty \leq 1/2 + Q/(2B)$ and $\|a_0(x)\|_\infty \leq B/2$. For any $v=(v_0, v_1) \in R_{n,Q}^2$, we define $Rd(v) = (Rd(v_0), Rd(v_1)) \in R_{n,Q}^2$. For any $v \in R_{n,Q}^2$ and $C \in R_{n,Q}^{2 \times 2}$, define their external product as $$v \otimes C = Rd(v) C \in R_{n,Q}^2,$$

where the right hand side is a usual vector-matrix product.

Next define the corresponding GSW cipher. Let $$D_Q = \left\lfloor \frac{Q}{4} \right\rfloor, \tilde{s} = \begin{pmatrix} -s(x) \\ 1 \end{pmatrix}.$$

For any $z(x) \in R_{n,Q}$ (say with small coefficients), a GSW cipher for $z(x)$ with error size $\tau$ is of the form $$GSW_s(z(x)) = A + z(x) BG_s \in R_{n,Q}^{2 \times 2},$$

where $A \in R_{n,Q}^{2 \times 2}$ and each row of $A$ is an RLWE sample (chosen independent randomly) so that $$A\tilde{s} = w^t(x) \bmod(x^n + 1, Q),$$

where $w(x) \in R_n^2$ with $\|w(x)\|_\infty \leq \tau$. An RLWE cipher for $z(x)$ with error size $\tau$ is of the form $RE_s(z(x)) = v + z(x) D_Q (0,1) \in R_{n,Q}^2$, where $v \in R_{n,Q}^2$ is an RLWE sample so that $$v\tilde{s} \equiv e(x) \bmod(x^n + 1, Q),$$

where $e(x) \in R_n$, with $\|e(x)\|_\infty \leq \tau$.

The following result holds. Let $z(x) \in R_n$ be any polynomial, $u_i \in \mathbb{Z}$ and $s_i \in \{0,1\}$. For any $RE_s(z(x))$ with error size $\tau$ and for $C_i = GSW_s(s_i) \in R_{n,Q}^2$ from the second type bootstrapping key bk with error size $\tau_1 = 2\log_2(n)$, where $0 \leq i \leq n-1$. Suppose $Q \geq 4n^2$ and $n \geq 100$. Then we have $$RE_s(z(x)) \otimes (BI_2 + (x^{u_i} - 1)C_i) = RE_s(z(x) \cdot x^{u_i s_i}),$$

where $I_2$ is the $2 \times 2$ identity matrix. Furthermore, $RE_s(z(x) \cdot x^{u_i s_i})$ has error size at most $\tau + 4.6\,nB$.

With either of the external products, an LWE cipher in $u \in \mathbb{Z}_r^n \times \mathbb{Z}_r$ can be lifted to an RLWE cipher in $R_{m,Q}^2$ where $m=r/2$. Here we show the embodiment of homomorphic lifting using the first external product and the first type bootstrapping key, and for the second type bootstrapping key, one just needs to replace $(G + (x^{u_k} - 1)C_k)$ in the external product by $(BI_2 + (x^{u_k} - 1)C_k)$.

---

| Homomorphic Lifting: HomLift(u,bk) | |
|---|---|
| Input: | $u = (u_0, \ldots, u_{\{n-1\}}, u_n) \in \mathbb{Z}_r^n \times \mathbb{Z}_r$, and $m = r/2$, $bk = (C_0, C_1, \ldots, C_{\{n-1\}})$: the first type bootstrapping key. |
| Output: | $A = (A_0, A_1) \in R_{m,Q}^2$ |
| Step 1. | Initialization: $t(x) := \sum_{j \in T} x^j$ where $T := \{j \in \mathbb{Z} : -D_r < j < D_r\}$ $A := (0, t(x) x^{-u_n} \tilde{D}_Q) \in R_{m,Q}^2$ |
| Step 2. | For k from 0 to n − 1 do $A := A \otimes (G + (x^{u_k} - 1)C_k)$. |
| Step 3. | Return $A \in R_{m,Q}^2$. |

The bootstrapping processor (BP) is presented in the following diagram where $$ModRed(w_i, Q, r) = \left\lfloor \frac{r w_i}{Q} \right\rceil$$

and $$\text{Extract}(a(x), i) = (a_i, a_{i-1}, \ldots, a_0, -a_{m-1}, -a_{m-2}, \ldots)$$

taking only the first n entries in the last vector.

---

| Bootstrapping Processor (BP) | |
|---|---|
| Input: | $v_1, v_2 \in \mathbb{Z}_r^n \times \mathbb{Z}_r$ where $v_i = E_s(z_i)$ for $z_1, z_2 \in \{0,1\}$, $bk = (C_0, C_1, \ldots, C_{\{n-1\}})$: the first type bootstrapping key. |
| Output: | $E_s(z_1 \wedge z_2)$, $E_s(z_1 \vee z_2)$, $E_s(z_1 \oplus z_2) \in \mathbb{Z}_r^n \times \mathbb{Z}_r$. |
| Step 1. | Compute $u := v_1 + v_2 = (u_0, \ldots, u_{n-1}, u_n) \in \mathbb{Z}_r^n \times \mathbb{Z}_r$. |
| Step 2. | Compute $A := HomLift(u, bk)$. |
| Step 3. | Extracting coefficients: Suppose $A = \sum_{i=0}^{m-1} a_i x^i, \sum_{i=0}^{m-1} b_i x^i \in R_{m,Q}^2$, let $w_1 := \left(\text{Extract}\left(a(x), \frac{3m}{4}\right), \tilde{D}_Q + b_{\frac{3m}{4}}\right) \in \mathbb{Z}_Q^n \times \mathbb{Z}_Q$ $w_2 := \left(-\text{Extract}\left(a(x), \frac{m}{4}\right), \tilde{D}_Q + b_{\frac{m}{4}}\right) \in \mathbb{Z}_Q^n \times \mathbb{Z}_Q$ $w_3 := w_2 - w_1$. |
| Step 4. | Modulus reduction: For i from 1 to 3 do $c_i := ModRed(w_i, Q, r) \in \mathbb{Z}_r^n \times \mathbb{Z}_r$. |
| Step 5. | Return $c_1, c_2, c_3 \in \mathbb{Z}_r^n \times \mathbb{Z}_r$. |

We next explain how the operation $u = v_1 + v_2$ and the coefficient extracting operations in BP are related. Suppose $E_s(z_1) = (a_1, b_1)$ and $E_s(z_2) = (a_2, b_2)$ where $a_1, a_2 \in \mathbb{Z}_r^n$ and $$b_i \equiv \langle s, a_i \rangle + z_i D_r + e_i \pmod{r},$$

for some $e_i \in \mathbb{Z}$ with $|e_i| < D_r/4$ for $i=1, 2$. We note that $$b_1 + b_2 \equiv \langle s, a_1 + a_2 \rangle + (z_1 + z_2)D_r + e_1 + e_2 \pmod{r},$$

and in Z we have $$z_1 + z_2 = 2(z_1 \wedge z_2) + (z_1 \oplus z_2).$$

Therefore, $$b_1 + b_2 \equiv \langle s, a_1 + a_2 \rangle + (z_1 \wedge z_2) \cdot 2D_r + (z_1 \oplus z_2) D_r + e_1 + e_2 \pmod{r}. \qquad (8)$$

We can let $u = (u_0, \ldots, u_{n-1}) = a_1 + a_2 \in \mathbb{Z}_r^n$, $u_n = b_1 + b_2 \in \mathbb{Z}_r$, and $e = e_1 + e_2 \in \mathbb{Z}$. Then $|e| < D_r/2$ and the equation (8) becomes $$u_n \equiv \sum_{i=0}^{n-1} s_i u_i + (z_1 \wedge z_2) \cdot 2D_r + (z_1 \oplus z_2) D_r + e_1 + e_2 \pmod{r}. \qquad (9)$$

We can let $w = u_n - \Sigma_{i=0}^{n-1} s_i u_i$. Since $D_r = m/2 = r/4$, the equation (9) implies the following:

$$w - \frac{r}{8} \equiv (z_1 \wedge z_2)m + \left((z_1 \oplus z_2) - \frac{1}{2}\right)D_r + e \pmod{r},$$

$$w + \frac{r}{8} \equiv (z_1 \vee z_2)m - \left((z_1 \oplus z_2) - \frac{1}{2}\right)D_r + e \pmod{r}.$$

In the second equation, we used the fact that $$(z_1 \oplus z_2) = (z_1 \vee z_2) - (z_1 \wedge z_2). \quad (10)$$

Since $|e| < D_r/2$ and $(z_1 \oplus z_2) - 1/2 = \pm 1/2$, we have $$|\pm((z_1 \oplus z_2) - 1/2)D_r + e| \leq 1/2 D_r + |e| < 1/2 D_r + 1/2 D_r = D_r.$$

Therefore, $$w - \frac{r}{8} \equiv (z_1 \wedge z_2)m + e_1 \pmod{r}, \quad (11)$$

$$w + \frac{r}{8} \equiv (z_1 \vee z_2)m + e_2 \pmod{r}, \quad (12)$$

for some $e_1, e_2 \in \mathbb{Z}$ with $|e_1| < D_r$ and $|e_2| < D_r$.

We can use the group homomorphism from the additive subgroup $(\mathbb{Z}_r, +)$ to the following multiplicative group of $R_{m,Q} = \mathbb{Z}[x]/(x^m+1, Q)$:

$$\langle x \rangle = \{x^i : 0 \leq i \leq r-1\} = \{1, x, \ldots, x^{m-1}, -1, -x, \ldots, -x^{m-1}\},$$

mapping $i \in \mathbb{Z}_r$ to $x^i \in R_{m,Q}$. For any subset $T \subseteq \mathbb{Z}_r$, let $$t(x) = \sum_{i \in T} x^i \in R_{m,Q}.$$

For example, if $r=20$, $m=10$ and $T = \{1, 2, -4, 17\}$, then $$t(x) = x + x^2 + x^{-4} + x^{17} \equiv x + x^2 - x^6 - x^7 \pmod{x^m+1}.$$

For this $t(x)$, its the coefficient at $x^2$ is 1, its coefficient at $x^{m+2} = x^{12}$ is $-1$ (since $x^2 \equiv -x^{12}$), and its coefficient at $x^3$ is 0 since none of 3 and $m+3$ is in $T$. Note that if $T = \{w, w+m\}$, then $t(x) = x^w + x^{w+m} \equiv x^w + (-1) \cdot x^w \equiv 0 \pmod{x^m+1}$. Therefore, we can avoid using any subset $T$ that contains $w$ and $m+w$ for some $w$.

Assume $w \in \mathbb{Z}_r$ satisfies (11) and (12). Let the coefficients of $t(x)x^{-w} \pmod{x^m+1}$ at $x^{3m/4}$ and $x^{m/4}$ be $c_1$ and $c_2$, respectively. Then $$2(x_1 \wedge x_2) = 1 + c_1, \quad 2(x_1 \vee x_2) = 1 - c_2.$$

Therefore, by (10), we have $2(x_1 \oplus x_2) = -(c_1 + c_2)$.

Suppose $m = r/2$ is divisible by 4. We use a special set $T$ and its associated polynomial:

$$T = \{j \in \mathbb{Z} : |j| < D_r\},$$

$$t(x) = \sum_{j \in T} x^j \pmod{x^m+1}$$

called the error polynomial, since $T$ represents the set of all possible error values of our LWE ciphers. In order to compute $RE_s(t(x)x^{-w})$ in $R_{m,Q}^2$ where $w = u_n - \Sigma_{i=0}^{n-1} u_i s_i$, we first the the following result. We can let $z \in \{0,1\}$, $u \in \mathbb{Z}_r$ and $z(x) \in R_{m,Q}$. Suppose $RE_s((z(x)) \in R_{m,Q}^2$ has error size $\tau$ and $C = GSW_s(z) \in R_{m,Q}^{(2\ell) \times 2}$ has error size $\tau_1$. Then $$RE_s(z(x)) \otimes (G + (x^u - 1)C) = RE_s(z(x)x^{zu}) \in R_{m,Q}^2,$$

and furthermore, $RE_s(z(x)x^{zu})$ has error size at most $x + 4Br \ell \tau_1$. Hence the RLWE cipher $RE_s(t(x)x^{-w})$ is indeed computed by the homomorphic lifting procedure above.

Putting together, the following theorem ensures the correctness of the bootstrapping procedure above. Suppose $s \in \{0,1\}^n$ has Hamming weight at most $\rho$, the first bootstrapping key bk has error size at most $\tau_1$ r is divisible by 8 and $$r \geq 16\rho, \ B^\ell \geq Q \geq \frac{n}{\rho - 1} 16 B r^2 \ell \tau_1.$$

Then, for any two LWE ciphers $E_s(z_i) = v_i \in \mathbb{Z}_r^n \times \mathbb{Z}_r$ with error size $< D\_r/4$ where $z_i \in \{0,1\}$ for $i=1, 2$, the bootstrapping procedure (BP) above outputs three LWE ciphers $$E_s(z_1 \wedge z_2), E_s(z_1 \vee z_2), E_s(z_1 \oplus z_2) \in \mathbb{Z}_r^n \times \mathbb{Z}_r,$$

all with error size $< \rho \leq D_r/4$.

In Table 1 below, we illustrative parameters that can satisfy the conditions above where a secret key has Hamming weight $\rho = n/8$. We can choose primes q and Q so that $r|(q-1)$, $r|(Q-1)$, so that FFT can be used in computing products of polynomials in $R_{n,q}$ and $R_{m,Q}$. The second row under q and Q indicates the bit size of q and Q, respectively, where $c_0 = 17 \cdot 2^7$. The row for c_s gives the ciphertext expansion under private-key encryption, that is, the bit size of a ciphertext of an n-bit message divided by n; the row for c_pk gives the ciphertext expansion under public-key encryption, and the row of bk is for the size of the first type bootstrapping keys It is also possible to pick Q as a product of two primes so that FFT can be used, but the details are omitted here.

TABLE 1

| n | $2^9 = 512$ | $2^{10} = 1024$ | $2^{11} = 2048$ | $2^{12} = 4096$ |
|---|---|---|---|---|
| r | 2n | 2n | 2n | 2n |
| q − 1 | r(16n + 11) | r(16n + 5) | r(16n + 7) | r(16n + 4) |
|  | 24 bits | 26 bits | 28 bits | 30 bits |
| Q − 1 | $r(c_0 r^3 n^2 + 6)$ | $r(c_0 r^3 n^2 + 13)$ | $r(c_0 r^3 n^2 + 9)$ | $r(c_0 r^3 n^2 + 28)$ |
|  | 70 bits | 76 bits | 82 bits | 88 bits |
| c_s | 6 | 6 | 6 | 6 |
| c_pk | 16 | 17 | 18 | 19 |
| bk | 10 MB | 40 MB | 172 MB | 739 MB |

For illustration of efficiency, we next compare our schemes with that of Ducas and Micciancio (DM15) and Chillottie et al. (CG17) for n=512. For security purpose, one needs to use n bigger than 512. The related parameters for n=512 are summarized in Table 2 below where $\mathbb{C}$ 53 means operations on complex numbers $a+bj$ where $j=\sqrt{-1}$ and a and b are real numbers with 53 bits in binary floating points.

TABLE 2

|  | r | m | Q | bk | #FFT | Failure |
|---|---|---|---|---|---|---|
| DM15 | 2048 | 1024 | 32 bits | 1032 (+314) MB | 48000 | $2^{-31}$ |
| CG17 | 2048 | 1024 | $\mathbb{C}53$ | 16 (+29) MB | 3072 | $2^{-33}$ |
| Ours | 1024 | 512 | 70 bits | 10 MB | 3072 | 0 |

In all the cases, FFTs used in computing the external product have length m, and the number of FFTs used in each case is indicated in the column under #FFT. The column under bk lists the size of bootstrapping keys where the numbers in the parenthesis denote the size of key-switch keys used in their papers. The last column is for the failure probability: in their schemes bootstrapping one bit operation results in one LWE cipher and which may be invalid with probability $2^{-33}$, while our scheme has no failure at all. Compared with CG17, this invention uses the same number of FFT's but with length only half, and each bootstrapping operation in CG17 computes one bit operation, while the present invention can use a bootstrapping method that can compute three LWE ciphers $E_s(x_1 \wedge x_2)$, $E_s(x_1 \vee x_2)$ and $E_s(x_1 \oplus x_2)$ in about the same time or less.

In another exemplary embodiment, one use the second type bootstrapping keys, and the size of bootstrapping key can be further reduced by one half. It is also possible to pick Q as a product of two primes so that FFT can be used, but the details are omitted here. With this choice, the size of bootstrapping can be further reduced by half and the bootstrapping speed is two times faster, since the size of a 2×2 matrix is half of the size of an 4×2 matrix, and vector-matrix product uses half many operations.

In another exemplary embodiment, we illustrate how to use BP to perform homomorphic computing when a pseudocode function $f$ that is given as a pseudocode which may contain if-statement functions, for-loop functions and while-loop functions, among other statements. Homomorphically computing $f$ can be illustrated by a few examples. For if-statements, we demonstrate by the following example:

"if $a \neq b$ then $u$ else $v$"

where $a=(a_1, \ldots, a_m) \in \{0,1\}^m$, $b=(b_1, \ldots, b_m) \in \{0,1\}^m$ and $u=(u_1, \ldots, u_k) \in \{0,1\}^k$, $v=(v_1, \ldots, v_\ell) \in \{0,1\}^\ell$. Suppose a LWE cipher has been computed for each bit of a and b, and let $$z = \bigvee_{i=1}^{m} (a_i \oplus b_i).$$

Then $z=1$ iff $a \neq b$. We can compute an LWE cipher $E_s(z) \in \mathbb{Z}_r^n \times \mathbb{Z}_r$ using 2 m−1 BP operations, that is, calling the bootstrapping algorithm 2 m−1 times. If $k \neq \ell$, we can pad u or v by 0's so that they have the same length, so that that $\ell = k$. Let $$w = zu \oplus (1-z)v = (z \wedge u_1 \oplus (1-z) \wedge v_1, \ldots, z \wedge u_k \oplus (1-z) \wedge v_k).$$

Then w=u if z=1, and w=v if z=0, as required by the if-statement. If u and v are in plaintext, an LWE cipher for each bit $z \wedge u_i \oplus (1-z) \wedge v_i$ is simply $u_i E_s(z) + v_i(1-E_s(z))$, which still has error size $<D_r/4$. If the bits of u and v are given as LWE ciphers with error size $<D_r/4$, then an LWE cipher for each bit $z \wedge u_i \oplus (1-z) \wedge v_i$ can be computed with three BPs. Therefore, this if-statement can be computed using $(2m-1)+3\min\{\ell, k\}$ BPs.

In the case of for-loops, we demonstrate by integer addition. Let $a=(a_0, \ldots, a_{m-1})$ and $b=(b_0, \ldots, b_{m-1})$ be two integers in binary representation where $a_0$ and $b_0$ are the least significant bits. Let $c=(c_0, \ldots, c_m)$ represent their sum. The following pseudocode can be used for computing the bits of c.

$c_0 := a_0 \oplus b_0$; $z := a_0 \wedge b_0$;
for i from 1 to m − 1 do
　$t_1 := a_i \oplus b_i$; $t_2 := a_i \wedge b_i$;
　$c_i := t_1 \oplus z$; $t_3 := t_1 \wedge z$;
　$z := t_2 \oplus t_3$;
end for
$c_m := z$;
Return $(c_0, c_1, \ldots, c_m)$.

In the first line, z represents the carry of $a_0+b_0$. The three lines in the for-loop compute the sum $a_i+b_i+z$, certainly $c_i=(a_i \oplus b_i) \oplus z$ is the least significant bit, and the carry bit can be $$t_2 \oplus t_3 = (a_i \wedge b_i) \oplus (a_i \oplus b_i) \wedge z = (a_i \wedge b_i) \oplus (a_i \wedge z) \oplus (b_i \wedge z),$$

which is 1 if and only if two or three of $a_i$, $b_i$, z are equal to 1. Note that each line of the pseudocode can be computed by one BP, namely, using the bootstrapping algorithm described herein. Hence a+b can be computed by 3 m−2 BPs.

For while-loops, we demonstrate by integer comparison. We can have $a=(a_0, \ldots, a_{m-1})$ and $b=(b_0, \ldots, b_{m-1})$ be two integers as above. Homomorphically testing whether $a \geq b$ (as integers) means computing $z \in \{0,1\}$ so that z=1 iff $a \geq b$. An example of pseudocode could be:

$z := (a \geq b)$
$z := 1$; $i := m − 1$;
while $i \geq 1$ and $a_i = b_i$ do $i := i − 1$ end while
if $a_i < b_i$ then $z := 0$ end if
Return z.

The while-loop can be difficult to implement homomorphically, since there is no priori bound on the largest i with $a_i \neq b_i$. These difficulties can be mitigated or overcome by converting the while-loop into a for-loop as indicated in the following pseudocode for homomorphic comparison:

$z := (a \geq b)$
$z := 1$; $v := 1$; (v = 0 indicates when the above while-loop finishes)
for i from m − 1 down to 0 do
　$t := v \wedge (a_i \oplus b_i)$;
　$v := (1 − t) \wedge v$;
　$z := [t \wedge (a_i \vee (1 − b_i))] \oplus [(1 − t) \wedge z]$;
end for
Return z.

Note that $a_i \oplus b_i = 1$ iff $a_i \neq b_i$, and $a_i \vee (1-b_i)=1$ iff $a_i \geq b_i$. Hence v changes from 1 to 0 at the largest i with $a_i \neq b_i$, and does not change back to 1 after that; also, when v=0, all the future t will be 0, hence z stays the same. This pseudocode can be directly implemented homomorphically. (Note that LWE ciphers for $a_i \oplus b_i$ and $a_i \vee (1-b_i)$ can be computed by one BP, since $1-(a_i \oplus b_i)=a_i \oplus (1-b_i)$, and one BP can compute both $a_i \oplus (1-b_i)$ and $a_i \vee (1-b_i)$.)

In summary, we see from these examples that one can homomorphically compute any pseudocode that contains if-statements, for-loops and while-loops, with the limitation that the number of times that the for-loops and while-loops are executed can be upper bounded by numbers that do not depend on encrypted data. The example for integer comparison shows how to convert a while-loop for which the number of executed times depends on encrypted data into a for-loop for which the number of executed times is independent of encrypted data. Under these limitations on the for-loops and while-loops, any pseudo code can be computed homomorphically.

Concrete security analysis of the schemes of this invention follows the standard approaches in the literature, so omitted here. In practice, one should use values of n at least 512, but not limited to the values in Table 1 above. The present invention is a compact fully homomorphic encryption system and method with a small cipher expansion that is suitable for practical applications in distributed networks of computers, including IoT, blockchains and cloud servers. The scheme can protect function privacy and can be used in many applications including outsourced computing, two-party secure computation, verifiable computing and zero knowledge proof, etc.

What is claimed is:

1. A computerized system for homomorphic encryption comprising:
   a key generation module configured to generate a secret key, a public key and a bootstrapping key;
   a private-key encryption module configured to generate a first ciphertext using the secret key;
   a public-key encryption module configured to generate a second ciphertext using the public key;
   a private-key decoding module configured to decode the first ciphertext, the second ciphertext and an encrypted analytic result;
   a homomorphic computational module configured to perform an analytical operation, according to an analytical operation request on the first ciphertext and the second ciphertext, including unpacking a Ring Learning With Errors (RLWE) cipher into a Learning With Errors (LWE) cipher and providing for the analytical operation using the bootstrapping key without decrypting the LWE cipher; and,
   wherein the encrypted analytical result is provided by the homomorphic computational module and are encrypted with the secret key.

2. The computerized system of claim 1 wherein the first ciphertext has a cipher expansion of six or less.

3. The computerized system of claim 1 wherein:
   the private-key encryption module and the public-key encryption module are disposed on a client in electronic communications with a server;
   the homomorphic computational module is disposed on the server; and,
   the encrypted analytical result is transmitted from the server to the client with the secret key.

4. The computerized system of claim 1 wherein the second ciphertext has a cipher expansion of 20 or less.

5. The computerized system of claim 1 including a bootstrapping processor configured to receive a first LWE cipher and a second LWE cipher encrypted using the secret key, and the bootstrapping key and to generate a set of new LWE ciphers having a first new LWE cipher, a second new LWE cipher and a third new LWE cipher; and,
   where the set of new LWE ciphers are in a same domain as the first LWE cipher and the second LWE cipher and have a same small modulus and error size as the first LWE cipher and the second LWE cipher.

6. The computerized system of claim 5 wherein the bootstrapping processor includes a homomorphic lifting procedure configured to lift an LWE cipher having a small modulus to a lifted ciphertext having a large modulus and perform a limited number of operations on the lifted ciphertext.

7. The computerized system of claim 6 wherein the bootstrapping processor includes a modulus reduction configured to transform the lifted ciphertext to a small modulus ciphertext wherein a reduced ciphertext has a small modulus and is always valid.

8. The computerized system of claim 1 wherein the homomorphic computational module is configured to
   receiving a function on a data in a form of an arithmetic circuit having gates, an input wire and an output wire;
   accessing the bootstrapping key and ciphertext;
   unpacking the ciphertext into a LWE cipher to provide an input to the input wire to the arithmetic circuit;
   performing the analytical operation to each gate in the arithmetic circuit in an order from input wire to the output wire;
   providing results from the analytical operation wherein a result LWE cipher at the output wires represent a result ciphertext of a value of the function; and,
   sending the result ciphertext to a client with the secret key wherein the result ciphertext is configured to be decoded by the client with the secret key where a decoded result is equal to the value of the function evaluated on an original data of the ciphertext.

9. The computerized system of claim 8 wherein there is no limit on a number of the gates in the arithmetic circuit representing the function.

10. The computerized system of claim 1 wherein the homomorphic computational module is configured to:
    receiving a function on a data in a form of a Boolean circuit having gates and an input wire and an output wire;
    accessing the bootstrapping key and first ciphertext;
    unpacking the first ciphertext into a LWE cipher to provide an input to the input wire to the Boolean circuit;
    performing the analytical operation to each gate in the Boolean circuit in an order from the input wires to the output wires;
    providing results from the analytical operation wherein the result LWE cipher at the output wires represent a result ciphertext of a value of the function; and,
    sending the result RLWE cipher to a client with the secret key wherein the result RLWE cipher is configured to be decoded by the client with the secret key where a decoded result is equal to a value of the function evaluated on an original data of the first ciphertext.

11. The computerized system of claim 10 wherein there is no limit on a number of gates in the Boolean circuit representing the function.

12. The computerized system of claim 1 wherein the public key encryption module is disposed with a client configured to collect data from a set of disparate sources with the secret key, encode the data using the public key, and deposit it on a remote server.

13. The computerized system of claim 1 including a cipher expansion of 20 or less.

14. A method for homomorphic encryption comprising:
    generating a secret key, a public key and a bootstrapping key;
    generating a first ciphertext using the secret key;
    generating a second ciphertext using the public key;
    receiving an analytical operation request;
    performing an analytical operation including unpacking a Ring Learning With Errors (RLWE) cipher into a Learning With Errors (LWE) cipher and using the bootstrapping key, according to the analytical operation request on the first ciphertext and the second ciphertext without decrypting the first ciphertext and the second ciphertext,
    providing an encrypted analytical result wherein the encrypted analytical results are encrypted with the secret key; and, providing results taken from the group consisting of the first ciphertext, the second ciphertext, the encrypted analytical result and any combination thereof.

15. The method of claim 14 including generating the first ciphertext using the secret key configured to have a cipher expansion of six or less.

16. The method of claim 14 including transmitting the encrypted analytical result from a server to a client.

17. The method of claim 14 including generating the second ciphertext configured to have a cipher expansion of 20 or less.

18. The method of claim 14 including
receiving a first LWE cipher and a second LWE cipher encrypted using the secret key and receiving the bootstrapping key; and,
generating a set of new LWE ciphers having a first new LWE cipher, a second new LWE cipher and a third new LWE cipher wherein the set of new LWE ciphers are in a same domain as the first LWE cipher and the second LWE cipher and have a same small modulus and error size as the first LWE cipher and the second LWE cipher.

19. The method of claim 18 including lifting the first ciphertext with a small modulus to a lifted ciphertext with a large modulus and perform a limited number of operations on the lifted ciphertext.

20. The method of claim 18 including reducing a large modulus ciphertext to a small modulus ciphertext wherein the small modulus ciphertext is always valid.

21. The method of claim 14 including:
receiving a function on a data in a form of an arithmetic circuit having gates and an input wire and an output wire;
accessing the bootstrapping key and first ciphertext;
unpacking the first ciphertext into a LWE cipher to provide an input to the input wire to the arithmetic circuit;
performing the analytical operation to each gate in the arithmetic circuit in an order from input wire to the output wire;
providing results from the analytical operation wherein a result RLWE cipher at the output wires represent a result ciphertext of a value of the function; and,
sending the result ciphertext to a client with the secret key wherein the result ciphertext is configured to be decoded by the client with the secret key where a decoded result is equal to a value of the function evaluated on an original data of the first ciphertext.

22. A computerized system for homomorphic encryption comprising:
a server having a non-transitory computer readable medium in communication with a first client and a second client;
a set of computer readable instructions disposed on the server that, when executed by a processor, performs the steps of:
receiving a public key and a bootstrapping key generated by the first client;
receiving a first ciphertext encrypted using a secret key;
receiving a second ciphertext encrypted using the public key;
performing an analytical operation including unpacking a Ring Learning With Errors (RLWE) cipher into a Learning With Errors (LWE) cipher and using the bootstrapping key according to an analytical operation request on the first ciphertext and the second ciphertext without decrypting the first ciphertext and the second ciphertext;
providing an encrypted analytical result wherein the encrypted analytical results are encrypted with the secret key.

23. The computerized system of claim 22 wherein performing an analytical operation includes the step of using a pseudocode function f taken from the group consisting of an if-statement function, a while-loop function, a for-loop function and any combination thereof.

* * * * *